US 12,290,053 B2

(12) United States Patent
Barnekow

(10) Patent No.: US 12,290,053 B2
(45) Date of Patent: May 6, 2025

(54) AUTOMATIC PET FOOD DISPENSER

(71) Applicant: Mythos Pet Foods, Inc, Palo Alto, CA (US)

(72) Inventor: Grant Edward Barnekow, Palo Alto, CA (US)

(73) Assignee: Mythos Pet Foods Inc., Palo Alto, CA (US)

( * ) Notice: Subject to any disclaimer, the term of this patent is extended or adjusted under 35 U.S.C. 154(b) by 106 days.

(21) Appl. No.: 17/841,425

(22) Filed: Jun. 15, 2022

(65) Prior Publication Data

US 2022/0394954 A1 Dec. 15, 2022

Related U.S. Application Data

(60) Provisional application No. 63/210,835, filed on Jun. 15, 2021.

(51) Int. Cl.
*A01K 5/02* (2006.01)
*B65G 1/02* (2006.01)

(52) U.S. Cl.
CPC .......... *A01K 5/0291* (2013.01); *A01K 5/0216* (2013.01); *A01K 5/0283* (2013.01); *B65G 1/026* (2013.01)

(58) Field of Classification Search
CPC .. A01K 5/0291; A01K 5/0283; A01K 5/0216; A01K 5/02
USPC ...................................................... 119/51.11
See application file for complete search history.

(56) References Cited

U.S. PATENT DOCUMENTS

| | | | | |
|---|---|---|---|---|
| 4,315,483 A | * | 2/1982 | Scheidler | A01K 5/0291 119/51.5 |
| 5,259,304 A | * | 11/1993 | Roberts | B30B 9/3064 100/223 |
| 8,100,084 B1 | * | 1/2012 | Abramson | A01K 5/0283 119/57.2 |
| 9,232,769 B1 | * | 1/2016 | Wolf | B65B 69/0033 |
| 10,046,904 B2 | * | 8/2018 | Evans | B65D 77/04 |
| 10,455,848 B2 | * | 10/2019 | Herbert | A23G 9/045 |
| 11,712,022 B2 | * | 8/2023 | Zhu | A01K 5/0291 119/51.11 |
| 2016/0000036 A1 | * | 1/2016 | Cornwell, Jr. | A01K 5/0291 119/51.11 |
| 2021/0176957 A1 | * | 6/2021 | List | A01K 5/0275 |

* cited by examiner

*Primary Examiner* — Peter M Poon
*Assistant Examiner* — Sahar Almatrahi
(74) *Attorney, Agent, or Firm* — FisherBroyles, LLP; John K. Shimmick

(57) ABSTRACT

Systems and methods for automated pet food dispensing are described. One apparatus includes a receptacle configured to hold a sealed container containing wet pet food. The apparatus may include an electrically-operated plunger configured to interface with the receptacle. A processing system may be connected to the electrically-operated plunger. In one aspect, the processing system is configured to initiate a pet feeding event by actuating the plunger to interface with the receptacle, puncture the sealed container, and dispense the wet pet food into the food bowl. The processing system may maintain a time history to determine one or more future pet feeding events.

9 Claims, 20 Drawing Sheets

AUTOMATIC PET FOOD DISPENSER

RELATED APPLICATION

This application claims the priority benefit of U.S. Provisional Application Ser. No. 63/210,835, filed Jun. 15, 2021, entitled "An Automatic Pet Feeder That Dispenses Wet Food From Cartridges," the disclosure of which is incorporated by reference herein in its entirety.

BACKGROUND

Technical Field

The present disclosure relates to systems and methods for implementing an automatic pet food dispenser that dispenses wet pet food from cartridges or containers.

Background Art

Wet pet food is objectively better for pet (e.g., dog or cat) health, but feeding a pet wet pet food can be labor-intensive. Most contemporary automatic feeders require at least some (oftentimes, a high) degree of manual involvement. Some contemporary systems require either feeding dry pet food or manually scooping wet pet food into a timed chamber with a small carry capacity. As soon as wet pet food is removed from its sealed aluminum can or container, the shelf life of the wet pet food is reduced, and bacterial growth increases at a rapid rate. This means there are only a limited number of meals these machines can carry. Dry pet food solutions are typically not suited to a pet's digestive nature. Long-term problems associated with dry pet food can include poor pet health and disease (e.g., diabetes, kidney failure, etc.).

SUMMARY

Aspects of the invention are directed to systems and methods for implementing an automated pet food dispenser that dispenses wet pet food substance (e.g., wet cat or dog food) from individual pouches, or containers. In one aspect, the automated pet food dispenser holds up to a week of pet food with substantially no reduction in the shelf life of the food. A load cell or other weighing mechanism may be used to measure a weight of a dispensed quantity of wet pet food, and a processing system may be used to regulate a quantity of food dispensed based on the weight measurement. One aspect includes a refrigeration unit that maintains the wet pet food at a temperature that is lower than an ambient temperature.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
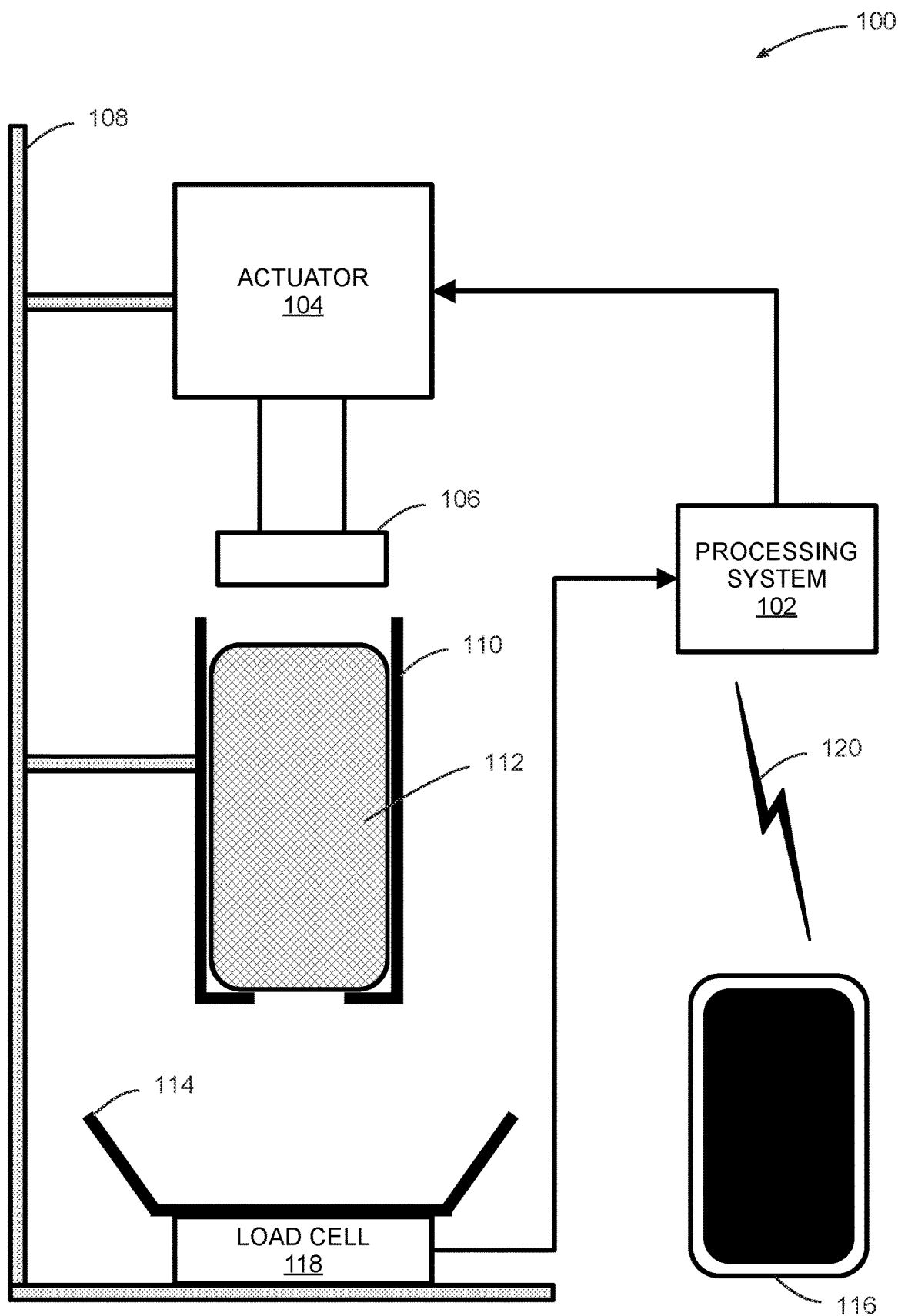
FIGS. 1A and 1B are block diagrams depicting an operation of an embodiment of an automated pet food dispenser.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein address challenges associated with manual feeding of wet pet food. One aspect includes placing one or more cartridges of wet pet food into an automatic pet food dispenser that is controlled by a processing system. The processing system may control the automatic pet food dispenser to automatically dispense wet pet food at a specific time or time intervals via a timer, or upon user command. User commands may be received via a built-in user interface, or via a connected device (e.g., a mobile phone or a tablet). An advantage of such an automatic pet food dispenser that dispenses wet pet food via one or more wet pet food storage cartridges includes increased shelf life of the wet pet food, reduced bacterial growth, and increased meal capacity for the pet (e.g., a cat or a dog).

FIG. 1A is a block diagram depicting an operation of an embodiment of an automated pet food dispenser 100. As depicted, automated pet food dispenser 100 includes processing system 102, actuator 104, plunger 106, support 108, receptacle 110, pet food container 112, food bowl 114, computing system 116, and load cell 118.

In one aspect, support 108 is substantially rigidly mechanically connected to actuator 104 and receptacle 110. Receptacle 110 may be configured to receive and store pet food container 112. Pet food container 112 may be filled with wet pet food. In an aspect, a pet food container such as pet food container 112 may also be referred to as a "cartridge." Pet food container 112 may also be substantially sealed to appropriately preserve the contained wet pet food for a specified amount of time. In one aspect, the wet pet food can be preserved for a period of 4 months to 3 years, depending on factors such as sealing of pet food container 112, and environmental factors such as ambient temperature and humidity.

In one aspect, processing system 102 is configured to control actuator 104 and extend or retract plunger 106. Plunger 106 may be extended by actuator 104 to apply a pressure or force on pet food container 112. As a result of this force, the sealed pet food container 112 (or cartridge) may rupture or puncture and dispense a part of or the entire contents of pet food container 112 into food bowl 114. A pet may be able to consume the dispensed wet pet food from food bowl 114. Food bowl 114 may be a pet food bowl. As depicted in FIG. 1A, plunger 106 is in a fully-retracted position.

In one aspect, actuator 104 is a linear actuator (e.g., a lead screw linear actuator). In other aspects, actuator 104 may be a pneumatic actuator, a hydraulic actuator, or a rigid chain-based actuator.

In one aspect, load cell 118 measures an amount of dispensed wet pet food in food bowl 114. Processing system 102 may be configured to receive a measurement of the amount of dispensed wet pet food from load cell 118. If the measured dispensed amount of wet pet food is greater than or equal to a predetermined amount, then processing system 102 may command actuator 104 to retract plunger 106. In this way, a known quantity of wet pet food is dispensed from pet food container 112. This enables a user to control an amount of wet pet food dispensed for a particular meal. In one aspect, meals are customizable and can be configured by a pet owner (i.e., a user). A typical meal might weigh 2-3 oz of wet pet food for an average cat. A feeding frequency of 2-4 meals per day may be programmed into processing system 102, depending on a size or weight of the pet. For dogs, a daily amount of 3 oz of wet pet food may be dispensed by automated pet food dispenser 100 for each 3-3.5 pounds of body weight of a dog.

Processing system 102 may be configured to determine how much food remains in pet food container 112 based on how much plunger 106 is extended. When plunger 106 is extended to a certain length (e.g., 6 inches), processing system 102 may determine that a bottom of plunger 106 may be close to a bottom end of receptacle 110. This, in turn, indicates that pet food container 112 is substantially empty. Processing system 102 may then completely command actuator 104 to completely withdraw plunger 106 from receptacle 110. Processing system 102 may also issue one or more user alerts for a user via a user interface, informing the user that pet food container 112 is substantially empty.

In one aspect, processing system 102 is configured to dispense a predetermined quantity of wet pet food at a given time of day, or dispense predetermined quantities of wet pet food at regular time intervals or at different preset times of day (e.g., 100 grams of wet pet food every eight hours). To achieve these functional aspects, processing system 102 may be appropriately programmed by a user via a user interface. User-programmable functions associated with processing system 102 may include a quantity of wet pet food to be dispensed at a particular meal, one or more feeding times, a feeding time interval, and so on. To implement these functions, processing system 102 may be a microcontroller, a digital signal processor (DSP), a field-programmable gate array (FPGA), a general processing system, a personal computing system, a mobile phone, a tablet, a laptop computer, a desktop computer, or any other similar processing system. As presented herein, processing system 102 generally includes a processor, a memory, and one or more communication interfaces.

In one aspect, one or more user-programmable functions may be input by a user on computing system 116, and then transmitted to processing system 102 via wireless communication link 120. Computing system may be any computing device such as a desktop computer, a laptop computer, a mobile phone, a tablet, or any other computing device. Wireless communication link 120 may be implemented as a communication link compliant with a Bluetooth® standard protocol, a communication link compliant with a Wi-Fi™ standard protocol, a communication link compliant with a Zigbee standard protocol, an ultrasonic communication link, or as a communication link compliant with any other wireless communication protocol. In one aspect, computing system 116 may run an application software that allows a user to configure, control, and monitor aspects of automated pet food dispenser 100.

Figure 1B:
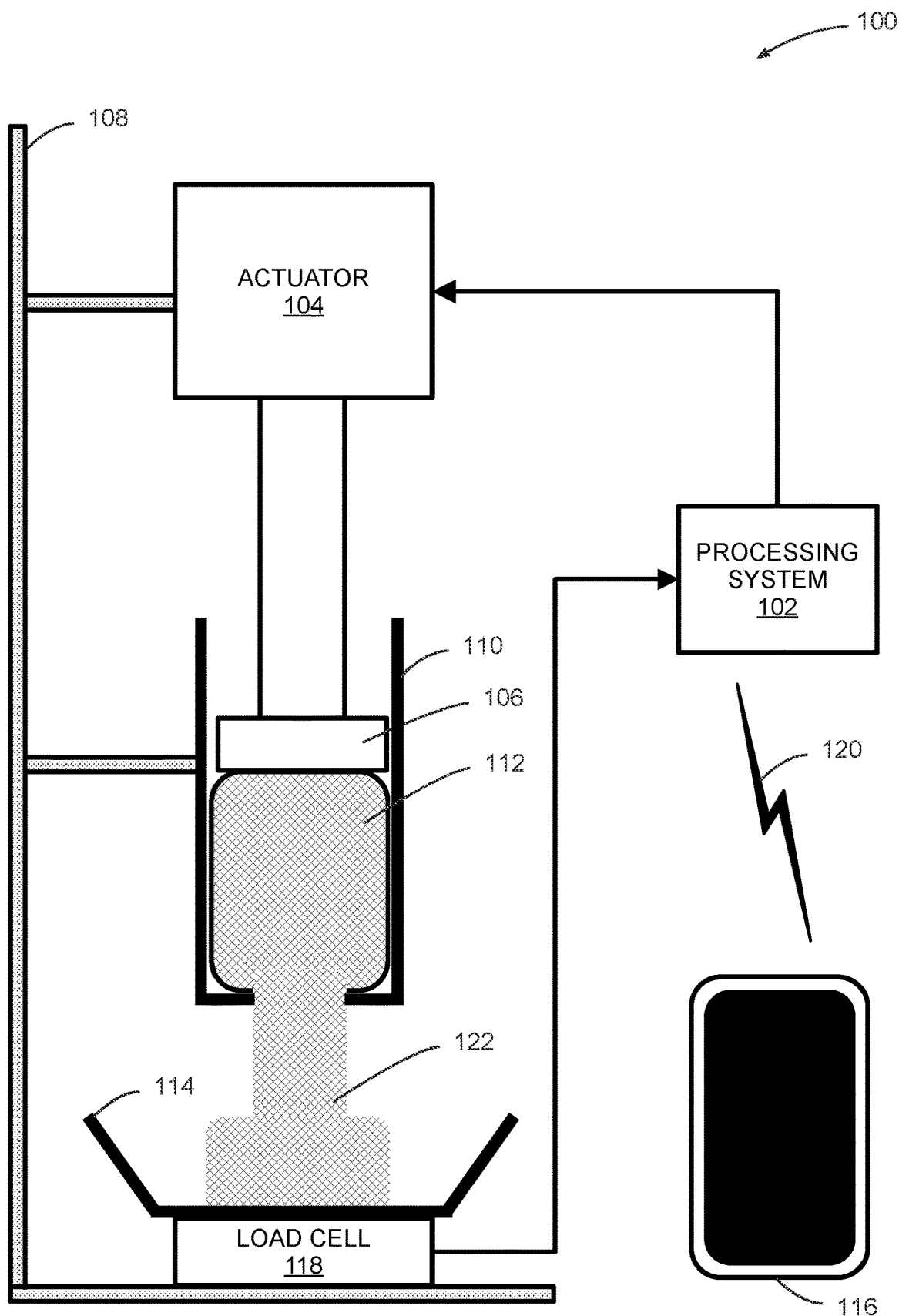

FIG. 1B is a block diagram depicting an operation of automated pet food dispenser 100. FIG. 1B depicts automated food dispenser as including processing system 102, actuator 104, plunger 106, support 108, receptacle 110, pet food container 112, food bowl 114, computing system 116, and load cell 118.

As depicted in FIG. 1B, plunger 106 is shown to be extended by actuator 104, to be in an extended position. As plunger 106 is extended by actuator 104 upon command from processing system 102, plunger 106 exerts a force on pet food container 112. Pet food container 112 is also physically constrained at a bottom end by receptacle 110. This constraint may be due to a design of receptacle 110, or due to an insert placed into receptacle 110. Due to the forces exerted by plunger 106 and receptacle 110, pet food container 112 may rupture. In one aspect, pet food container 112 may be designed to rupture at a bottom end so that the wet pet food contained within pet food container 112 is dispensed (or extruded) out into food bowl 114 as dispensed pet food 122. In one aspect, load cell 118 measures a quantity (e.g., a weight) of dispensed pet food 122. If the weight of dispensed pet food 122 is greater than or equal to a predetermined quantity as programmed into processing system 102, processing system 102 may command actuator 104 to stop extending plunger 106 further, and possibly retract plunger 106 back to a fully-retracted state as shown in FIG. 1A. A pet may now feed from food bowl 114. Since a predetermined quantity of food has been dispensed, underfeeding or overfeeding of the pet may be avoided.

Automated pet feeder 100 may be used on a daily basis for automatically dispensing a known quantity of wet pet food to a pet. For example, when a pet owner goes to work, the pet owner (user) may program processing system to dispense predetermined amounts of pet food at predetermined times while the pet owner is away. In one aspect, food bowl 114 is removeable for cleaning and sanitizing, and may be replaced with a similar food bowl. In one aspect, food bowl 114 is attached to load cell 118 via a magnetic coupling. In one aspect, load cell 118 may be replaced by a similar weight-measuring device.

Figure 2:
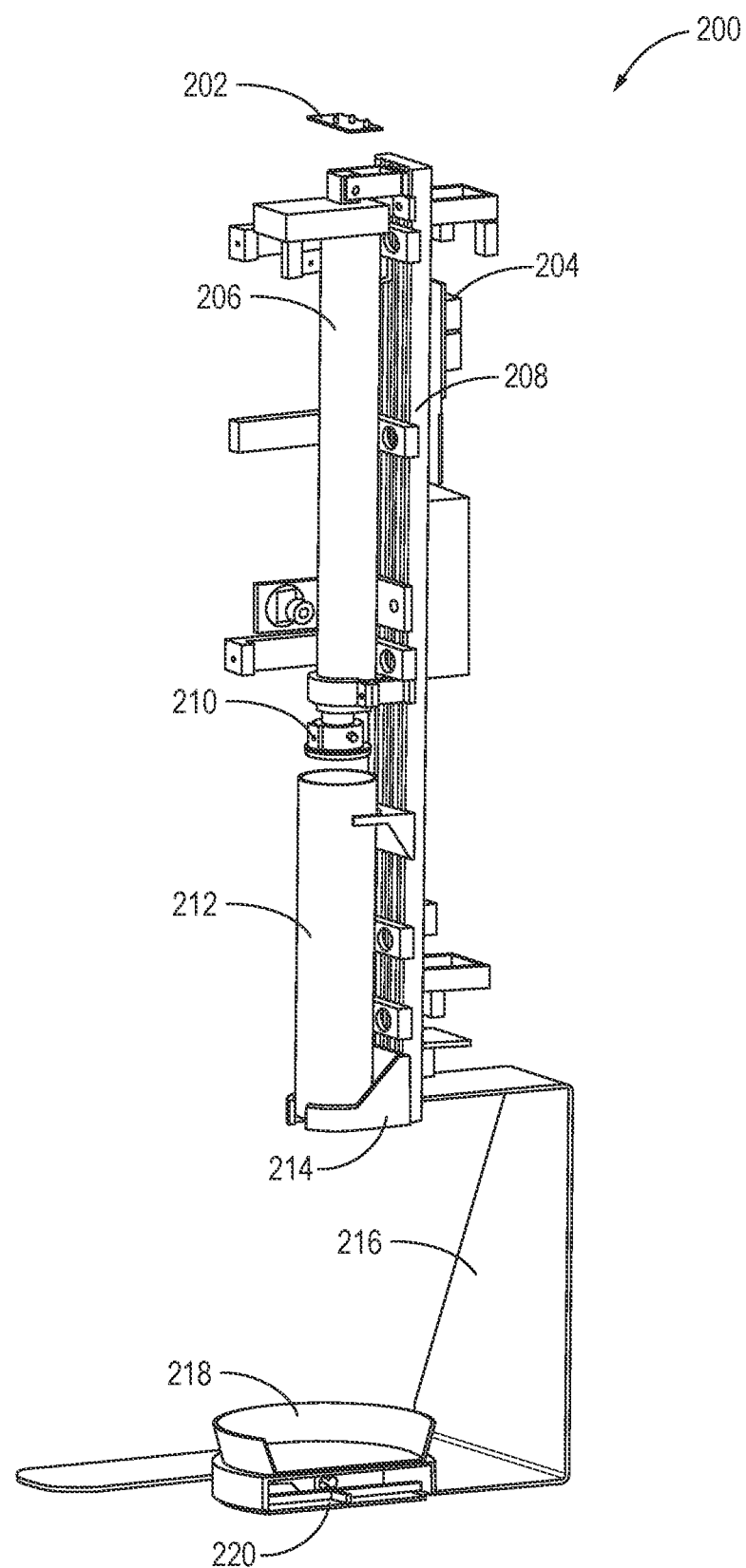
FIG. 2 is a schematic diagram depicting an embodiment of an automated pet food dispenser.

FIG. 2 is a schematic diagram depicting an embodiment of an automated pet food dispenser 200. As depicted, automated pet food dispenser 200 includes user interface 202, processing system 204, linear actuator 206, supporting structure 208, plunger 210, receptacle 212, receptacle support 214, support 216, food bowl 218, and load cell 220.

In one aspect, user interface 202 allows a user (e.g., a pet owner) to interact with automated food dispenser 200. User interface 202 may include any combination of input/output devices such as push buttons, video display screens, LCD screens, touch screens, switches, incandescent bulbs, LED bulbs, haptic feedback devices, and so on. In one aspect, a user programs data such as a feeding schedule (e.g., a feeding time or a feeding time interval), and a quantity of wet pet food to be dispensed, via user interface 202. In one aspect, user input/output components associated with user interface 202 may be integrated onto a printed circuit board (PCB).

In one aspect, processing system 204 is similar to processing system 102, and may perform functions similar to processing system 102. Processing system 204 may receive one or more user commands and data entered via user interface 202 or via a computing system such as computing system 116, and may use these commands and data to appropriately schedule a pet feeding routine, while dispensing a predetermined amount of pet food.

Supporting structure 208 may provide a substantially rigid support structure for automated pet food dispenser 200. Specifically, supporting structure 208 may provide a substantially rigid support for linear actuator 206, receptacle 212, processing system 204, user interface 202, and other components of automated pet food dispenser 200. Supporting structure 208 may be similar to support 108.

Linear actuator 206 may be similar to actuator 104, and may receive one or more instructions or commands from processing system 204 to extend or retract plunger 210. Linear actuator 206 may be any of a lead screw linear actuator, a pneumatic actuator, a hydraulic actuator, or a rigid chain-based actuator. Receptacle support 214 may provide a substantially rigid support to a lower end of receptacle 212.

In one aspect, support 216 supports user interface 202, processing system 204, linear actuator 206, supporting structure 208, plunger 210, and receptacle 212. Food bowl 218 may be similar to food bowl 114. Food bowl 218 may rest on load cell 220 that may be similar to load cell 118.

In one aspect, a pet food container similar to pet food container 112 may be inserted or placed into receptacle 212. At a designated pet feeding time, processing system 204 may command linear actuator 208 to extend plunger 210 into receptacle 212. Plunger 210 may exert a force on the pet food container within receptacle 212. In one aspect, motion of the pet food container within receptacle 212 is constrained by an insert. The insert may prevent motion of the pet food container while linear actuator 206 applies a force to the pet food container via plunger 210. The force exerted by plunger 210 may cause the pet food container to rupture, and the contents of the pet food container may be dispensed into food bowl 218 through an opening at the bottom of receptacle 212.

In one aspect, a quantity of pet food dispensed may be measured by load cell 220. Measurements from load cell 220 may be received by processing system 204. Processing system 204 may command linear actuator 206 to stop extending plunger 210 when a quantity of food in food bowl 218 as measured by load cell 220 is greater than or equal to a predetermined amount. Processing system 204 retract plunger 210 so that plunger 210 is completely outside of receptacle 212.

In one aspect, electrical portions of automated pet food dispenser 200 (e.g., processing system 204 and user interface 202. may be collectively referred to as "electronics." The electronics serve several roles in automated pet food dispenser 200. The electronics may provide connectivity, either to a local device (e.g., computing device 116 that may be a smartphone), or to the cloud. This connectivity may be accomplished via wireless communication link 120 (e.g., a communication link compliant with a Wi-Fi-or Bluetooth-standard protocol). In one aspect, wireless communication link 120 allows a user to remotely set feed times, check feed status, view how much food has been consumed, or other perform useful functions associated with automated pet food dispenser 200. The electronics also monitor the scale (e.g., load cell 118 or 220) under the food bowl (e.g., food bowl 114 or 218), provide power and control to the actuator (e.g., actuator 104 or linear actuator 206), check for user inputs, and other routine functions. The electronics tell the actuator (e.g., actuator 104 or linear actuator 206) to dispense food at the set times or when otherwise commanded to by the user, and monitor how much food is dispensed.

Figure 3:
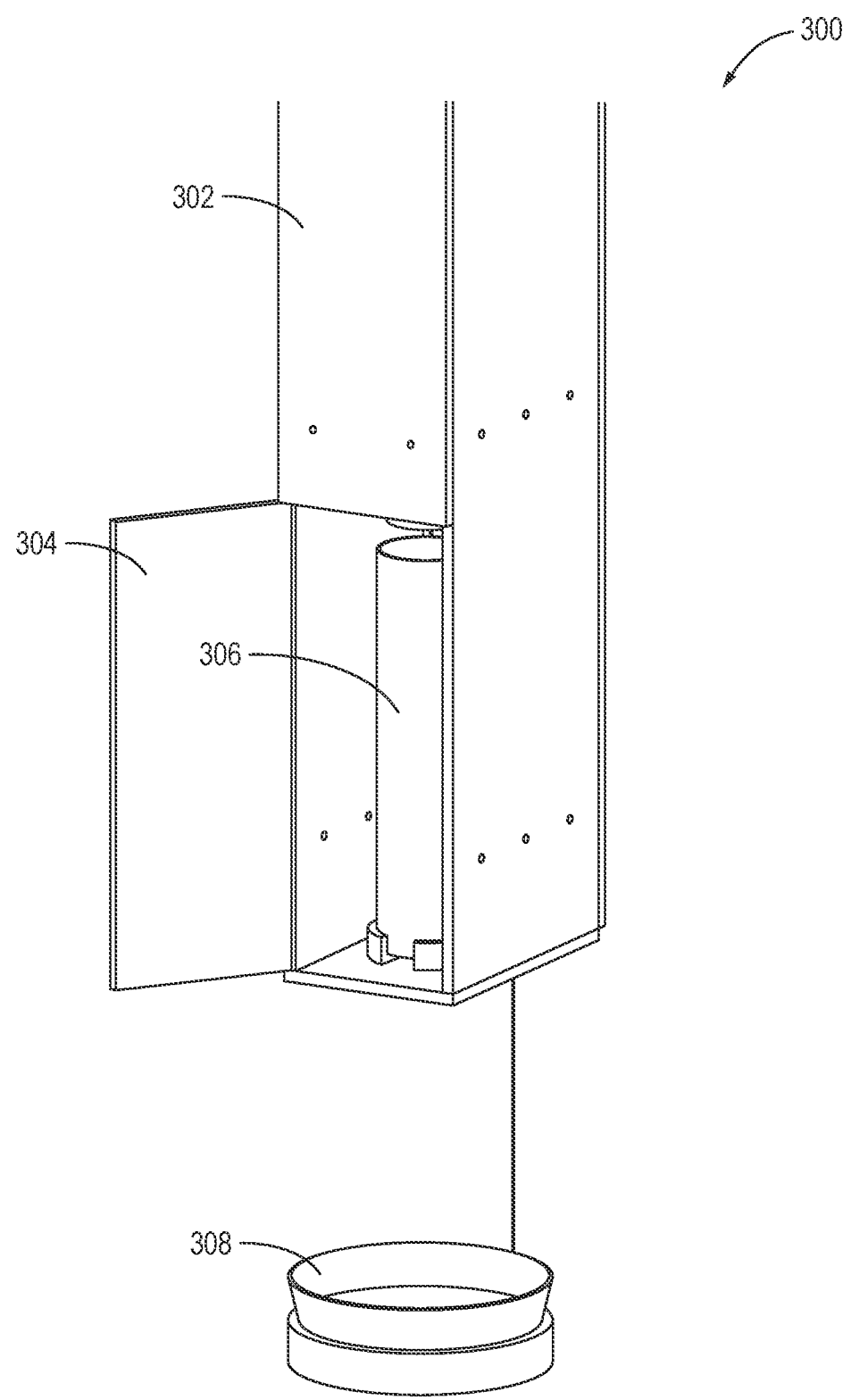
FIG. 3 is a schematic diagram depicting a view of an embodiment of an automated pet food dispenser.

FIG. 3 is a schematic diagram depicting a view 300 of an embodiment of an automated pet food dispenser. As depicted, view 300 includes cover 302, cover door 304, receptacle 306, and food bowl 308. In one aspect, an automated pet food dispenser (e.g., automated pet food dispenser 200) may be housed in cover 302. Cover door 304 may be opened to gain access to receptacle 306. Via cover door 304, a user may be able to refill receptacle 306 with a new pet food container, or remove an empty pet food container from a previous feeding. Cover 302 may include an opening or orifice at a bottom end (not shown), through which wet pet food may be dispensed from receptacle 306 into food bowl 308. Cover 302 may also include one or more inserts to provide a substantially rigid support for receptacle 306. Cover 302 may also house other components of an automated pet food dispenser such as actuator 104, plunger 106, and processing system 102.

Figure 4:
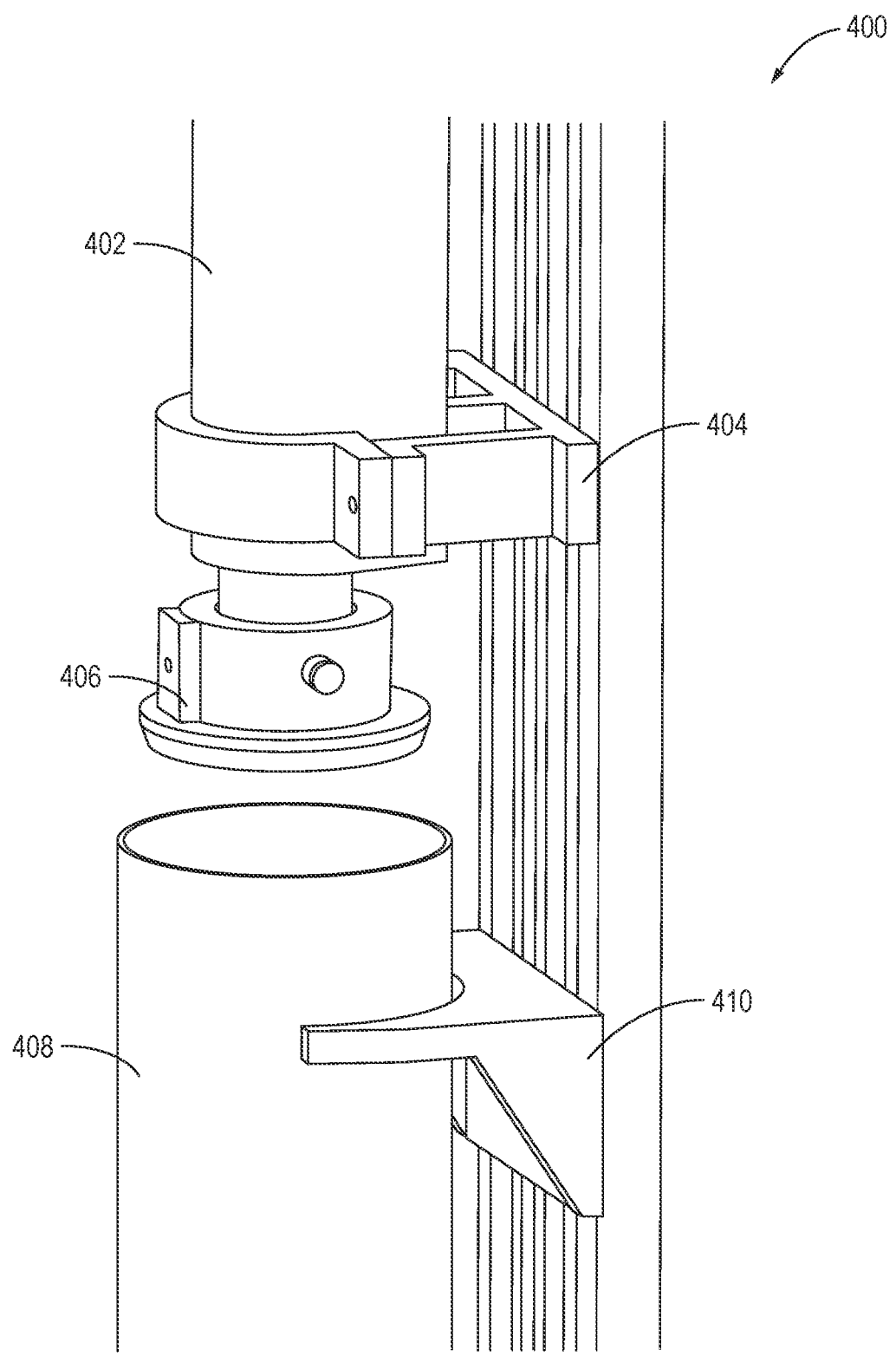
FIG. 4 is a schematic diagram depicting an interface between a plunger and a receptacle.

FIG. 4 is a schematic diagram depicting an interface 400 between a plunger 406 and a receptacle 408. As depicted, actuator 402 (similar to actuator 104) may be substantially rigidly supported by support 404, that is substantially rigidly connected to supporting structure 412. Receptacle 408 (similar to receptacle 110) may be substantially rigidly supported by support 410, that is substantially rigidly connected to supporting structure 412. Supporting structure 402 may be similar to support 108 or supporting structure 208.

In one aspect, piston 406 is similar to plunger 106. Piston 406 may be configured to be substantially coaxial with receptacle 408, so that piston 406 is contained within receptacle 408 when piston 406 is extended by actuator 402.

Figure 5:
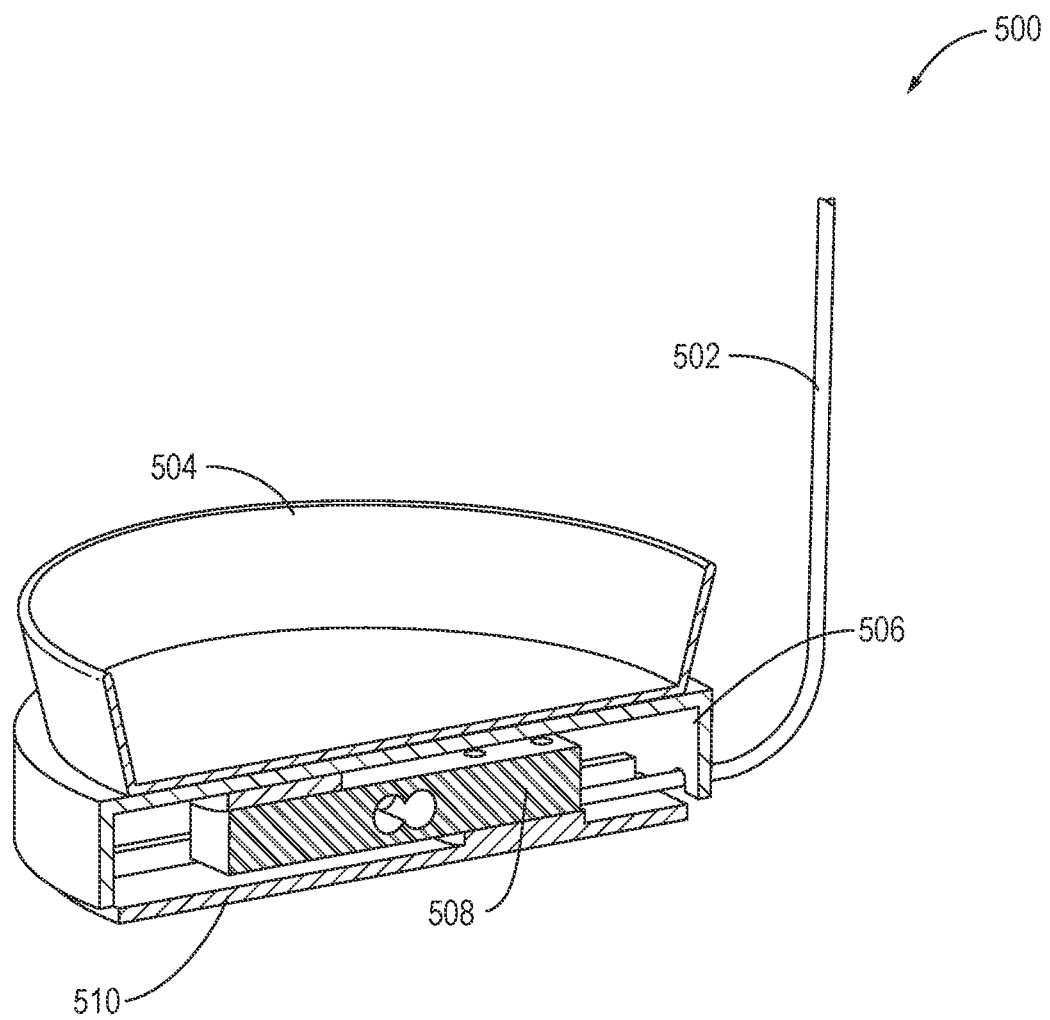
FIG. 5 is a schematic diagram depicting a view of a food receptacle and a weighing apparatus.

FIG. 5 is a schematic diagram depicting a view 500 of a food receptacle and a weighing apparatus. As depicted, view 500 includes food bowl 504 (also referred to as a "food receptacle"), connecting wire(s) 502, top shell 506, load cell 508, and base piece 510. In one aspect, food bowl 504 may be similar to food bowl 114. Top shell 506 may enclose load cell 508 and provide a support base for food bowl 504. Load cell 508 may rest on base piece 510. In one aspect, connecting wire(s) 502 communicate one or more electrical signals between processing system 102 and load cell 508. These electrical signals may include initialization and calibration signals from processing system 102 to load cell 508, and weight measurement signals from load cell 508 to processing system 102.

Figure 6:
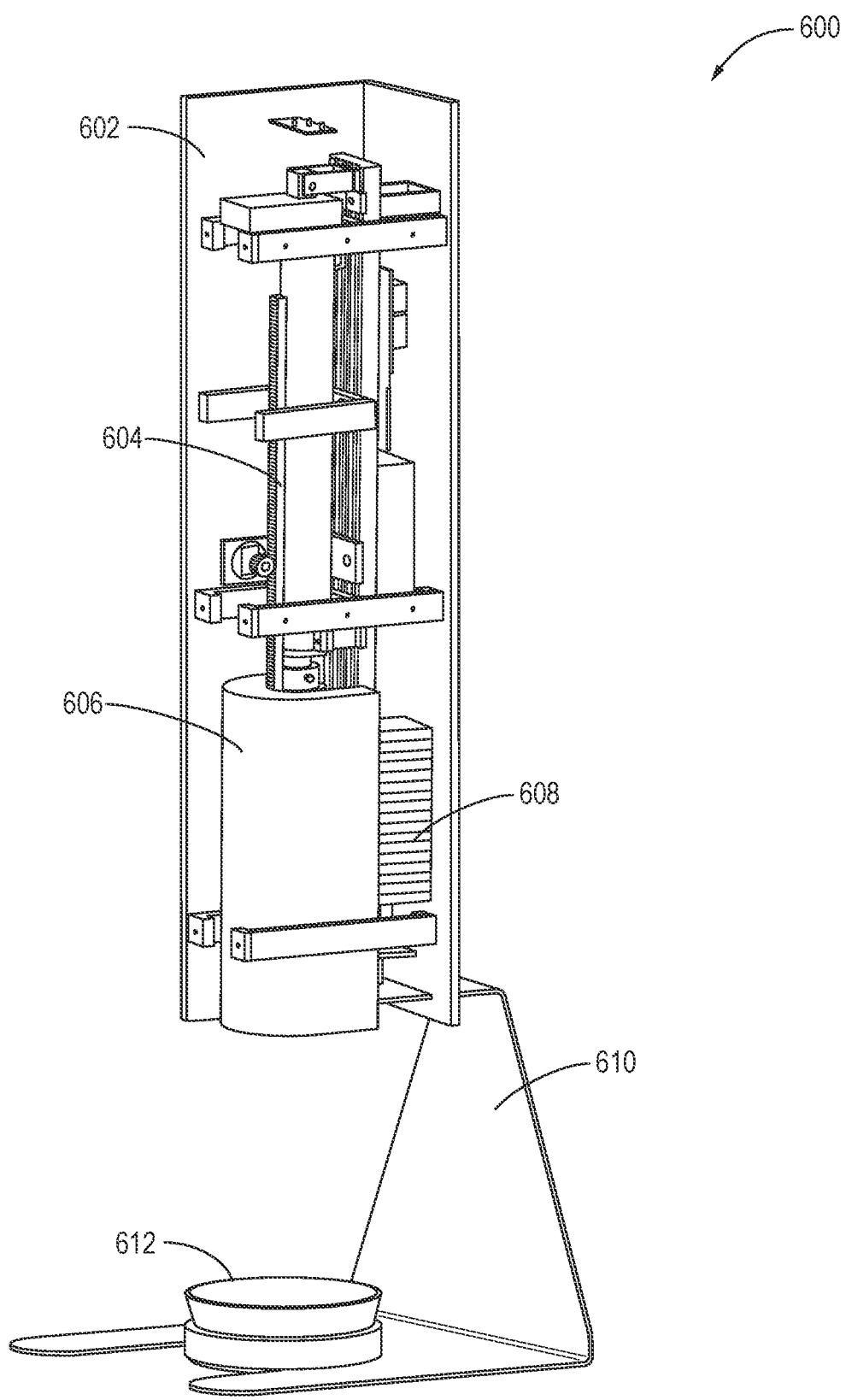
FIG. 6 is a schematic diagram depicting an embodiment of an automated pet food dispenser.

FIG. 6 is a schematic diagram depicting an embodiment of an automated pet food dispenser 600. As depicted, automated pet food dispenser 600 includes outer cover 602, actuator 604, insulation 606, cooling unit 608, support 610, and food bowl 612. Automated food dispenser 600 may be a modified version of automated food dispenser, to include refrigeration and insulation components (e.g., insulation 606 and cooling unit 608). Actuator 604 may be similar to actuator 104 or to linear actuator 206. Food bowl 612 may be similar to food bowl 114 or food bowl 218. Support 610 may be similar to support 216.

In one aspect, cooling unit 608 provides cooling or refrigeration functions to keep wet pet food in a pet food container (e.g., pet food container 112) within a receptacle (e.g., receptacle 110) at a lower temperature than an ambient temperature. Cooling unit 608 may also be referred to as a "refrigeration unit." To further help maintain the lower temperature, the receptacle may be surrounded or covered by insulation 606. Maintaining the wet pet food at a lower temperature than the ambient temperature helps increase food shelf life, reduce bacterial growth rates, and keep the wet pet food fresh for a longer period of time.

In one aspect, cooling unit 608 may be any combination of a thermoelectric cooler, a heatsink, and a fan. The thermoelectric cooler may help reduce a temperature of the wet pet food to a temperature below the ambient temperature. The heatsink may be used to dissipate any heat generated by components such as cooling unit 608, or processing system 102. The fan may be used to circulate air within automated pet food dispenser 600 to maintain a substantially constant temperature within automated pet food dispenser 600.

In one aspect, processing system 102 monitors a temperature of the wet pet food in pet food container 112, and controls cooling unit 608 via a feedback control loop to maintain the wet pet food at a substantially constant temperature. Such a feedback control loop may be configured such that cooling unit 608 is switched on or off based on commands from processing system 102. This, in turn, can allow automated pet food dispenser 600 to account for daily and seasonal temperature fluctuations in the ambient temperature while maintaining the temperature of the wet pet food in pet food container 112 at a substantially constant value.

Figure 7:
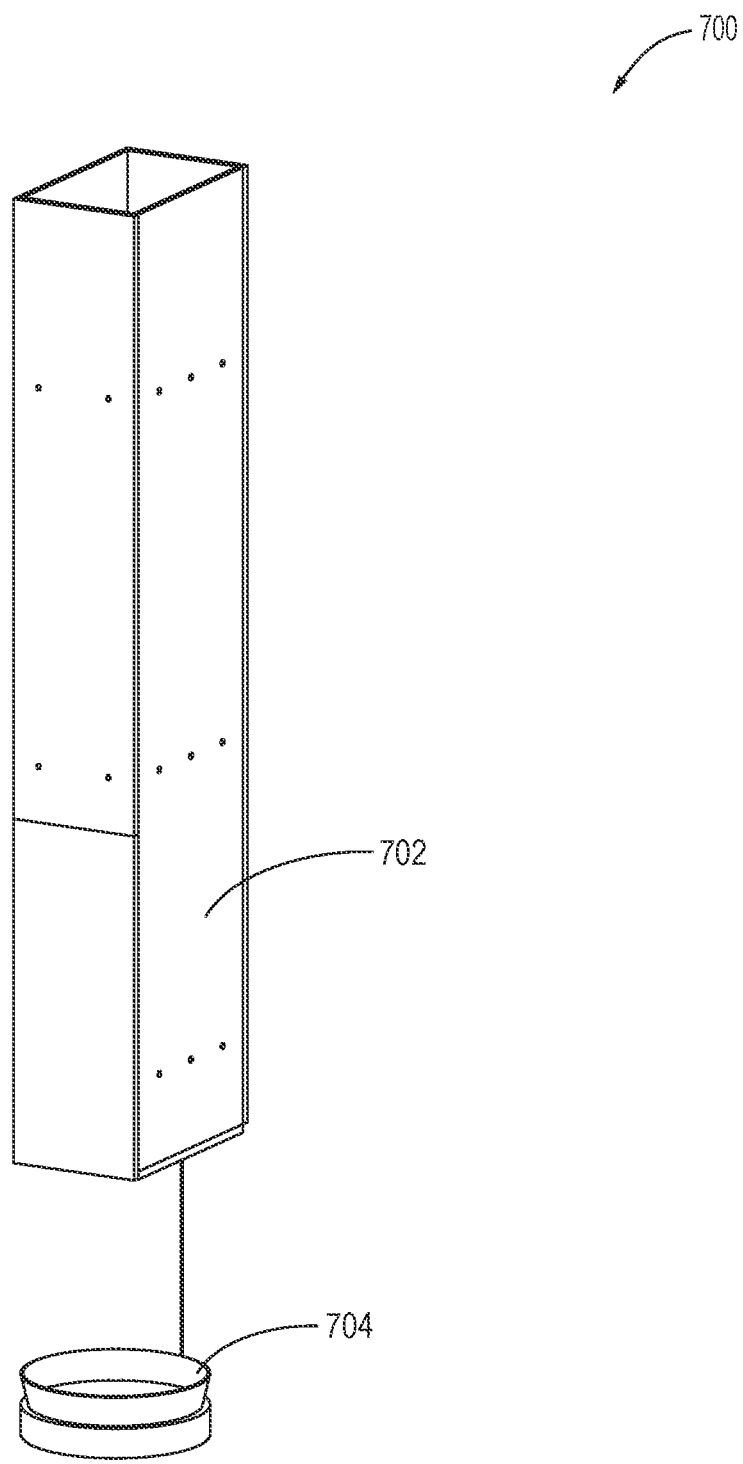
FIG. 7 is a schematic diagram depicting an embodiment of an automated pet food dispenser.

FIG. 7 is a schematic diagram depicting an embodiment of an automated pet food dispenser 700. Some aspects of automated pet food dispenser 700 include enclosing components such as processing system 102, actuator 104, plunger 106, and receptacle 110 in cover 702. A bottom end of cover 702 may be open to allow dispensing of wet pet food from automated pet food dispenser into bowl 704.

Figure 8:
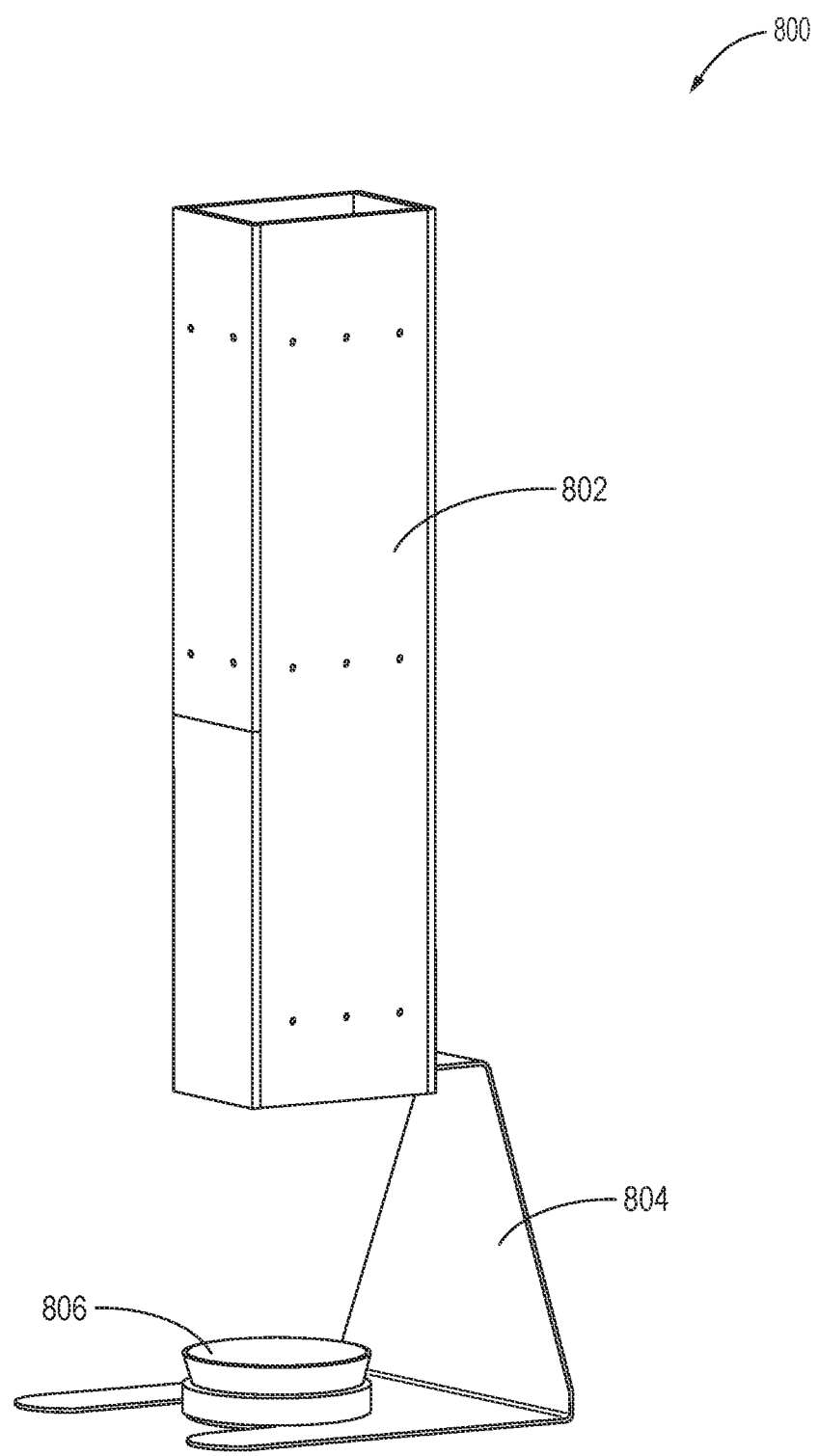
FIG. 8 is a schematic diagram depicting an embodiment of an automated pet food dispenser.

FIG. 8 is a schematic diagram depicting an embodiment of an automated pet food dispenser 800. Some aspects of automated pet food dispenser 800 include enclosing components such as processing system 102, actuator 104, plunger 106, and receptacle 110 in cover 802. A bottom end of cover 802 may be open to allow dispensing of wet pet food from automated pet food dispenser into bowl 806. Support 804 may provide support for automated pet food dispenser 800 in a manner similar to support 216.

As depicted, each of cover 702 and 802 (also known as an "outer shell") is a casing that is intended to provide environmental protection to the corresponding automated pet food dispenser. Each of cover 702 and 802 may also be designed to be cosmetically pleasing, and enhance a user experience. In one aspect, each of cover 702 and 802 provides structure and support for the internals (e.g., processing system 102, actuator 104, plunger 106, and receptacle 110), and have mounting features for securing the device to a stand or surface (e.g., support 216). Each of cover 702 or 802 may also have cutouts to allow LEDs or other status indicating elements to show system status and alerts, button(s) to control the associated functions, and possibly a screen to show device status.

In one aspect, each of cover 702 and 802 includes a door (e.g., door 304) which opens and allows the user to insert a food container into the device (e.g., a receptacle such as receptacle 110). In one aspect, cover 802 also includes a stand (e.g., support 804) that has a space for a food bowl (e.g., food bowl 806), under which there are weight sensors (e.g., load cell 118 or 508) to measure an amount of food currently in the bowl. In another aspect, a load cell may be integrated into a bottom of a food bowl, or bowl platform with integrated weight sensors may be used. In general, automated pet food dispenser 100 may include a shell (e.g., cover 302, outer cover 602, cover 702, or cover 802), electronics (e.g., processing system 204 and user interface 202), structure (e.g., supporting structure 208), actuator (e.g., actuator 104 or linear actuator 206), food storage (e.g., pet food container 112 and receptacle 110), and refrigeration (e.g., cooling unit 608).

As depicted, automated pet food dispenser 100 includes a single pet food container 112 in a single receptacle 110; however, multi-container automated pet food dispensers may also be implemented. In one design, this aspect takes the form of a carousel holding multiple pet food containers. This carousel can be rotated either manually or via an electrical motor to present different containers for dispensing. Food cartridges (e.g., pet food container 112) may be inserted into the device and placed into a chamber where there are mechanical restraints to hold them in place during storage and dispensing.

In one aspect, a pet food container 112 may be implemented as a pouch containing wet pet food. The pouch may be constructed of a material such as plastic, which is designed to rupture when plunger 106 exerts a force on it. Pet food container 112 may also be constructed of a malleable metal such as aluminum. Such a container may be designed with one or more seams that rupture upon application of an external force by plunger 106.

Advantages of automated pet food dispenser 100 include an ability to automatically dispense wet pet food via unique cartridges, increase shelf life of the wet pet food, reduce bacteria, and increase meal capacity. As presented, automated pet food dispenser 100 dispenses wet pet food substance from one or more custom-designed pouches. Automated pet food dispenser 100 can hold a week to a month's worth of wet cat or dog food, with years of shelf life. No manual handling or transfer of wet pet food substance is required by the owner or user.

One aspect of an automated pet food dispensing system may include:
1. Case (e.g., cover 302, 602, 702, or 802)
2. Base (e.g., support 610)
3. Stem (e.g., supporting structure 208)
4. Removable Carousel
5. Hinge (e.g., a hinged cover at a top end)
6. Plunger (e.g., plunger 106)
7. Electrical Motor (e.g., an electrical motor to actuate/rotate the removable carousel)
8. Electrical motor (e.g., actuator 104)
9. Power Supply (to power electronic components of the automated pet food dispenser)
10. Computer (e.g., processing system 102)
11. Digital interface (e.g., user interface 202)
12. Food cartridge (e.g., pet food container 112)
13. Food bowl (e.g., food bowl 114)

Item 1 Case encapsulates and houses all mechanical and electrical components. Item 2 acts as the bottom weight to stabilize the machine. Item 3 stem connects to item 1 case at the top and item 2 base and the bottom to physically construct the automated pet food dispenser. Item 4 removable carousel is accessed by opening item 1 case via item 5 hinge vertically in a clam shell type fashion, which can then be removed to reload food cartridges (item 12). Item 4 removable carousel also spins around as dictated by the computer (item 10) on a time based or user prompted command. Item 7 motor actuates the carousel motion prompted by said command and item 8 motor will work in conjunction with item 6 plunger to extrude item 12's (food cartridge) contents into the end receptacle (item 13, food bowl). Item 10's (processing system) logic and device interconnectivity via both Bluetooth® and Wi-Fi™ standard protocols will command the actuation of any mechanical or motorized functions. The digital interface (item 11) will also be user operated to offer inputs that can control when item 10 will dispense wet pet food. Item 13 (food bowl) sits on item 2 (base) as a removable vessel for wet pet food and can be reattached via a magnet.

The automated pet food dispenser may be opened from the top, pivoting on a hinge. The user can place a food cartridge into, for example, each of 14 empty chambers on the carousel. The user may close the top case, plug in the power supply and interact with the digital interface (e.g., user interface 202). The user can connect the digital interface to a phone application (e.g., an application running on computing system 116) and a Wi-Fi™ standard protocol, and determine the frequency and volume of food that will be extracted. Once these configurations are set, automated pet food dispenser 100 may have the actuator motor actuate the plunger and extract the wet pet food through a nozzle into the bowl. The actuator motor will then raise the plunger into its original state, freeing the carousel to then rotate to the next cartridge position to repeat the process. This process can occur as many times as there are full cartridges in the machine. Once the food has been consumed, the user can remove the food bowl to clean and keep the food bowl sanitary.

An orientation of the automated pet food dispenser can be reconfigured in a number of different ways and angles. The carousel can rotate 360 degrees as with the other elements to perform the same action. Extrusion of wet pet food can occur a number of ways depending on the design of pet food container 112 (e.g., a pet food cartridge, or "cartridge"). The cartridge can be reformed into a different shape, the motors and actuators can be reshaped or respecified or substituted by other mechanisms or motors.

A user would use automated pet food dispenser 100 to replace the existing process of opening a can of wet pet food and feeding their pet (e.g., a cat or a dog). Instead of opening a can of wet pet food and putting it into a bowl or plate for the pet to eat, the user would simply plug in the device, fill it with one or more pet food cartridges and set a timing function to give time-based feedings to the animal. This method of feeding wet pet food can be used for any animal that consumes a wet solid substance. It could even be used to dispense wet or solid substances that are non-edible or edible for humans and insects.

Figure 9:
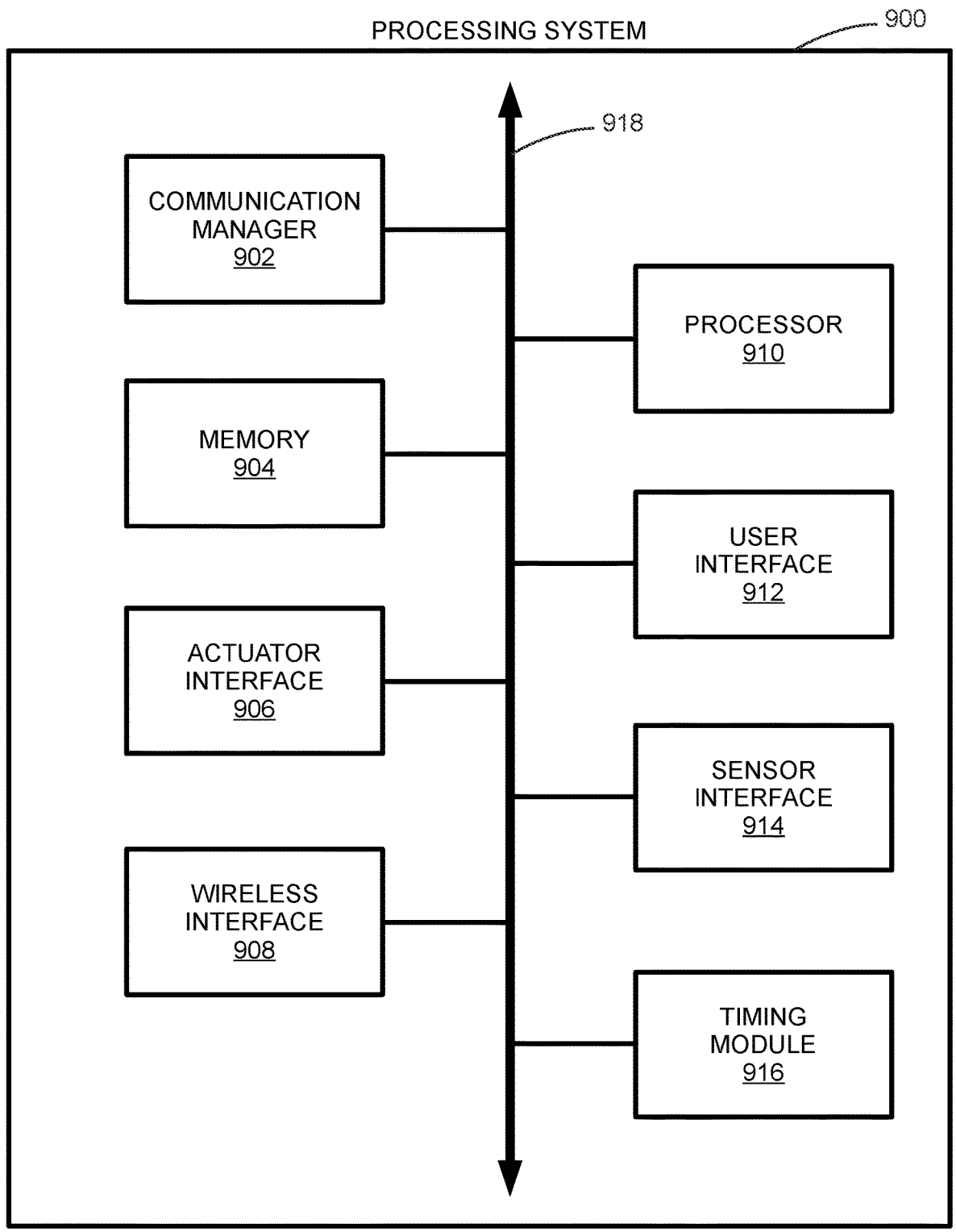
FIG. 9 is a block diagram depicting an embodiment of a processing system used for implementing certain processing functions of an automated pet food dispenser.

FIG. 9 is a block diagram depicting an embodiment of a processing system 900 used for implementing certain processing functions of an automated pet food dispenser. As depicted, processing system 900 includes communication manager 902, memory 904, actuator interface 906, wireless interface 908, processor 910, user interface 912, sensor interface 914, timing module 916, and data bus 918.

In one aspect, processing system 900 may be similar to processing system 102 or processing system 204. Communication manager 902 may be configured to manage communication between different internal components of processing system 102. For example, communication manager may include components such as one or more direct memory access (DMA) controllers, input-output arbitrators, and so on. Communication manager 902 may also manage communication between processing system 900 and different external peripheral devices such as load cell 118, and actuator 104.

Data associated with processing operations and general functionality of automated pet food dispenser 100 may be stored in memory 904. Memory 904 may store one or more instructions or instruction sets associated with running one or more programs or applications related to functioning of automated pet food dispenser 100. These instruction sets may be related to controlling actuator 104, and feedback control loop strategies that enable processing system 900 to command actuator 104 to stop extending plunger 106 when a quantity of dispensed pet food in food bowl 114 is greater than or equal to a predetermined amount. Memory 904 may also store data associated with an operation of automated pet food dispenser 100. For example, memory 904 may include a numerical value associated with the predetermined threshold. Memory 904 may also store data associated with feeding intervals and feeding times. Memory 904 may also store measurements of wet pet food dispensed, as measured by load cell 118. In one aspect, memory 904 may be implemented using any combination of random-access memory (RAM), read-only memory (ROM), hard disk drives, flash memory, nonvolatile memory, or any other memory components.

In one aspect, actuator interface 906 is configured to interface processing system 900 with an actuator such as actuator 104. Actuator interface 906 may implement actuator-specific communication protocols, such as pulse-width modulation (PWM) and other actuator and/or motor-related command protocols.

Wireless interface 908 may be configured to implement communication protocols associated with one or more wireless communication links such as wireless communication link 120. Examples of wireless communication links include communication links compliant with a Wi-Fi™, Bluetooth® or Zigbee standard protocol.

In one aspect, processor 910 is configured to implement one or more processing functions associated with an operation of automated pet food dispenser 100. These processing functions may include one or more mathematical or logical functions. Examples of processing functions implemented on processor 910 include comparing an amount of dispensed pet food with the predetermined threshold value. Processor 910 may be implemented as a single-core processor, or as a multi-core processor. Processor 910 may also include one or more graphics processing unit (GPU) arrays.

In one aspect, user interface 912 may interface processing system 900 with user interface 202. User interface 912 may include any combination of LED drivers, switch readers, push button readers, switch debounce logic for push button inputs, LCD touchscreen interfaces, and other input/output interfaces. User interface 912 might also implement communication protocols such as serial peripheral interface (SPI) or inter-integrated circuit (I2C) communication protocols to communicate with one or more multiplexers and/or demultiplexers that implement an appropriate input/output mapping between processing system 900 and any input/output devices.

Sensor interface 914 may be configured to read data from one or more sensors such as load cell 118. Sensor interface 914 may also be connected to sensors such as ambient light sensors, temperature sensors, and so on. Communication protocols such as serial peripheral interface (SPI) or inter-integrated circuit (I2C) communication may be used to interface sensor interface 914 with the one or more sensors. Sensor interface 914 may also include one or more analog-to-digital converters (ADCs) that convert any directly-input analog signals to digital signals.

In one aspect, timing module 916 may be configured to keep a track of time. This time data may be used to schedule one or more feedings via automated pet food dispenser 100. Timing module 916 may include one or more phase-locked loops to maintain a synchronous clock signal. Timing module 916 may also include a GPS module that outputs GPS time. The GPS time may be used by timing module 916 to keep a track of time.

Data bus 918 may connect the different internal components of processing system, and route data and instructions as needed between processor 910 and the other components of processing system 900.

Figure 10:
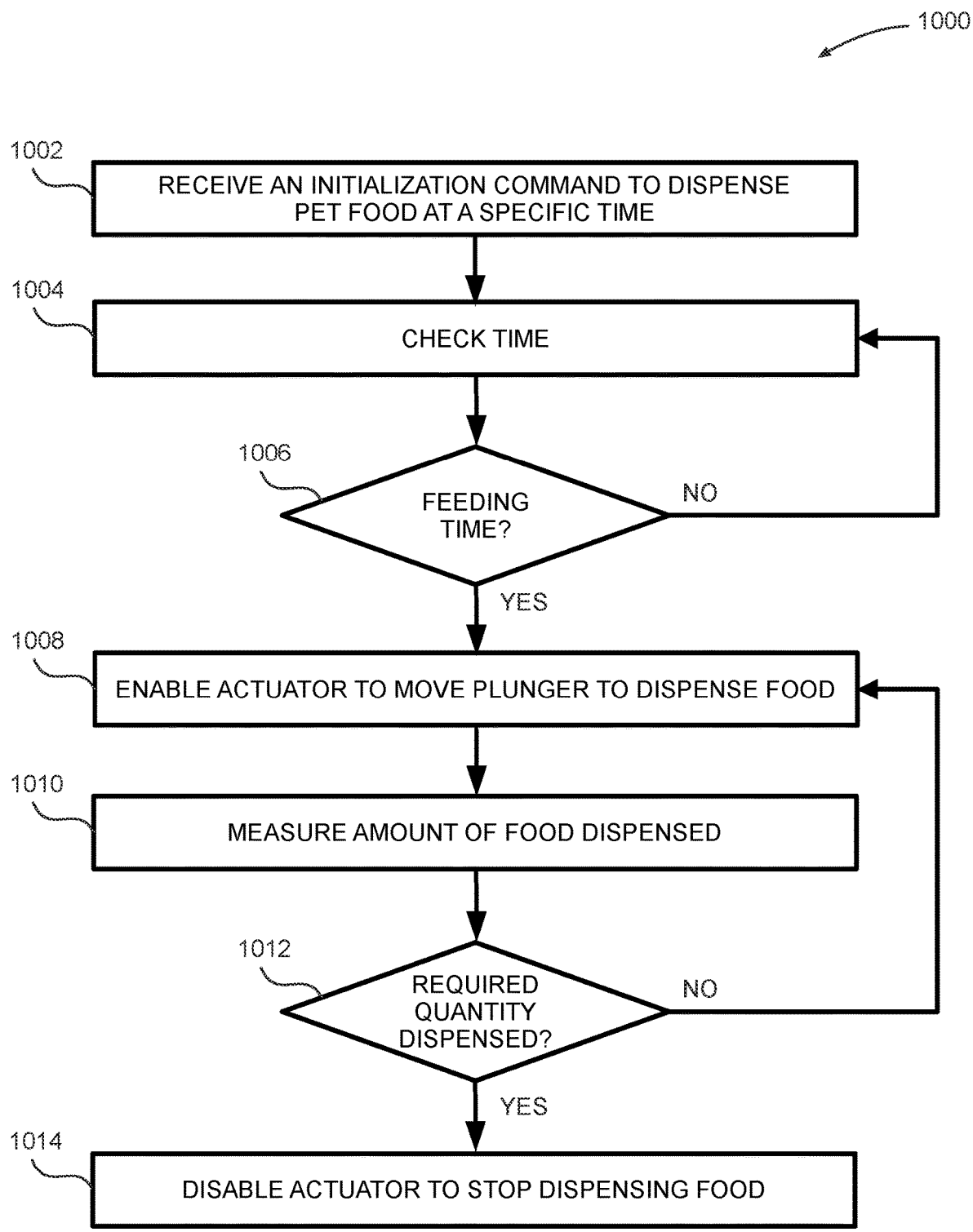
FIG. 10 is a flow diagram depicting a method to automatically dispense a given quantity of pet food.

FIG. 10 is a flow diagram depicting a method 1000 to automatically dispense a given quantity of pet food.

Method 1000 may include receiving an initialization command to dispense pet food (i.e., wet pet food) at a specific time (1002). For example, processing system 102 may receive an initialization command from computing system 116, to dispense wet pet food at a specific time.

Method 1000 may include checking a current time (1004). For example, processing system 102 (or processing system 900) may check a current time via timing module 916.

Method 1000 may include determining whether the current time is approximately equal to a feeding time as received via the initialization command (1006). For example, processing system may compare the current time with the feeding time. If the current time is not approximately equal to the feeding time, method 1000 returns to 1004.

If the current time is approximately equal to the feeding time, then method 1000 goes to 1008, which may include enabling an actuator to move a plunger to dispense the wet pet food. For example, processing system 102 may command actuator 104 to move plunger 106 such that wet pet food contained in pet food container 112 is dispensed into food bowl 114.

Method 1000 may include measuring an amount of wet pet food dispensed (1010). For example, load cell 118 may measure a quantity (i.e., an amount, or a mass, or a weight) of wet pet food dispensed into food bowl 114.

Method 1000 may include determining whether a required quantity of wet pet food has been dispensed (1012). For example, processing system 102 may receive a measurement of the amount of wet pet food dispensed in food bowl 114 from load cell 118. Processing system 102 may compare this measurement with a predetermined value that may be received as a part of the initialization command received at 1002.

If the quantity dispensed (i.e., the measurement) is less than the predetermined value, then method 1000 returns to 1008. If the quantity dispensed is greater than or equal to the predetermined value, then method 1000 goes to 1014, which may include disabling the actuator to stop dispensing food. For example, processing system 102 may command actuator 104 to stop extending plunger 106 so that no more wet pet food is dispensed from pet food container 112. Processing system 102 may also command actuator 104 to retract plunger 106.

Figure 11:
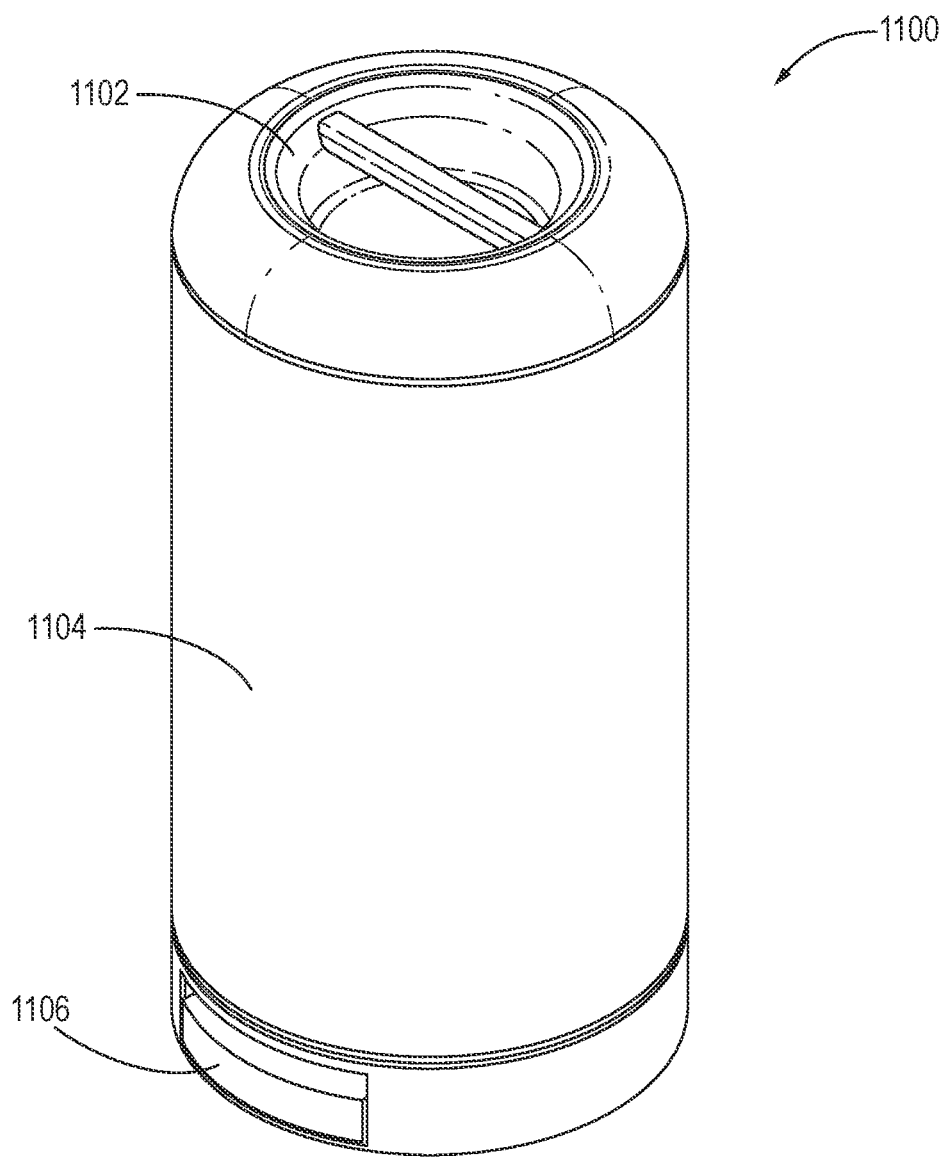
FIG. 11 is a schematic diagram depicting an embodiment of an automated pet food dispenser.

FIG. 11 is a schematic diagram depicting an embodiment of an automated pet food dispenser 1100. As depicted, automated pet food dispenser 1100 includes upper structure 1102, outer housing 1104, and drawer 1106.

In one aspect, upper structure 1102 may be designed to function as a carrying handle. A user may transport automated pet food dispenser 1100 using upper structure 1102 as a carrying handle. Upper structure 1102 may also include one or more LED lamps that may function as status indicators for automated pet food dispenser 1100. For example, the LED lamps may indicate if automated pet food dispenser 1100 has run out of food.

In one aspect, outer housing 1104 may serve as a protective covering for one or more internal elements of automated pet food dispenser 1100. In one embodiment, outer housing 1104 is constructed of multiple connected pieces. In another embodiment, outer housing 1104 is constructed as a single, solid structure. Outer housing may also serve to provide cosmetic or aesthetic appeal to automated pet food dispenser 1100.

Drawer 1106 may be configured to be a retractable drawer that can be used to support and store a food bowl such as food bowl 114 or 218. Under normal storage, when no pet feeding is occurring, drawer 1106 may be retracted to be substantially flush with an outer surface of outer housing 1104. In this position, the food bowl is concealed within automated pet food dispenser 1100. During a feeding session, automated pet food dispenser may fill the food bowl with the requisite quantity of food. Drawer 1106 may then be extended outwards by a processing system (e.g., processing system 102) to reveal the food bowl to the pet. After the pet consumes the food or after a specified amount of time, automated pet food dispenser 1100 (specifically, the processing system included in automated pet food dispenser 1100) may retract drawer 1106.

Figure 12A:
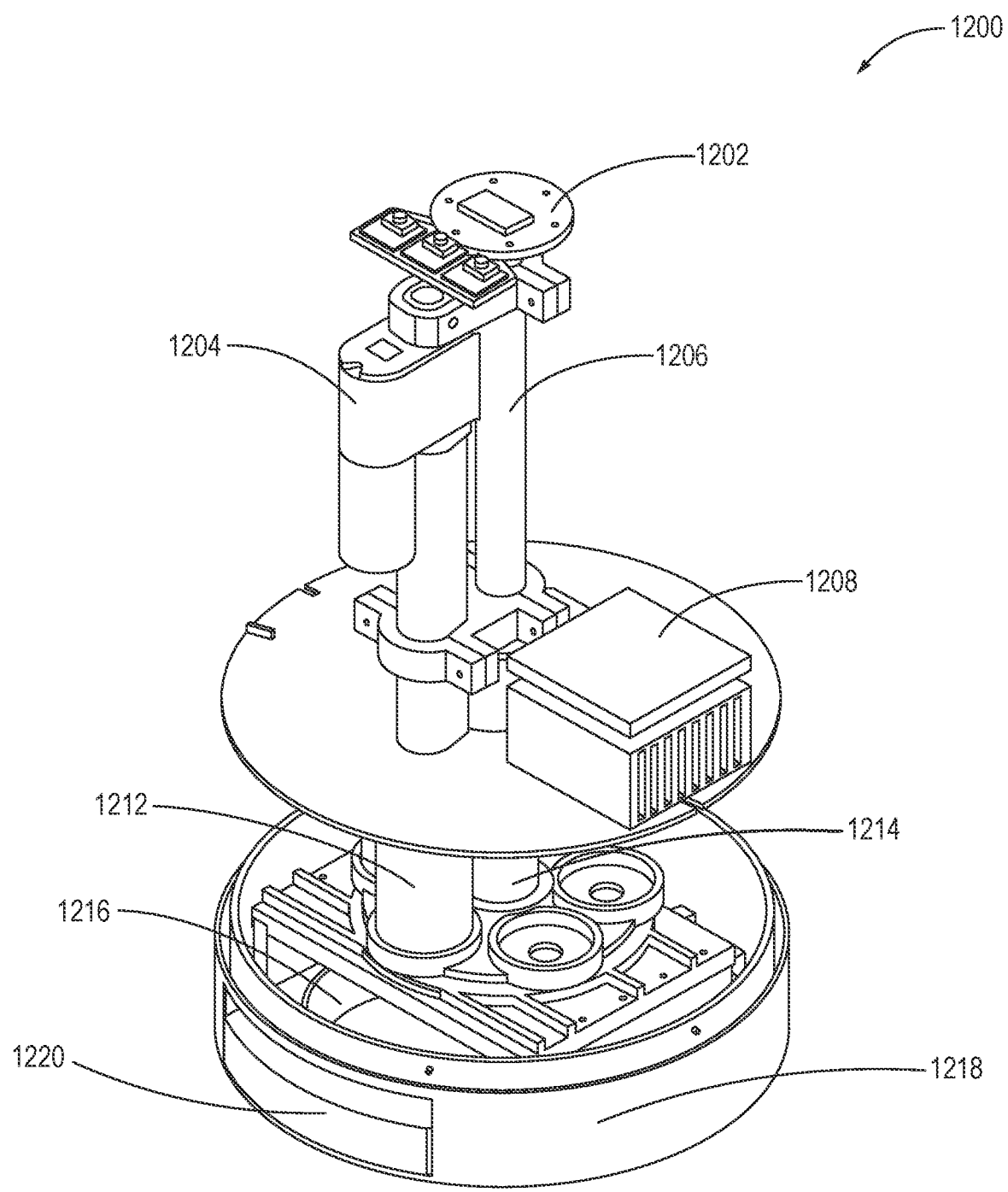
FIGS. 12A and 12B are schematic diagrams depicting an internal structure of an embodiment of an automated pet food dispenser.
Figure 12B:
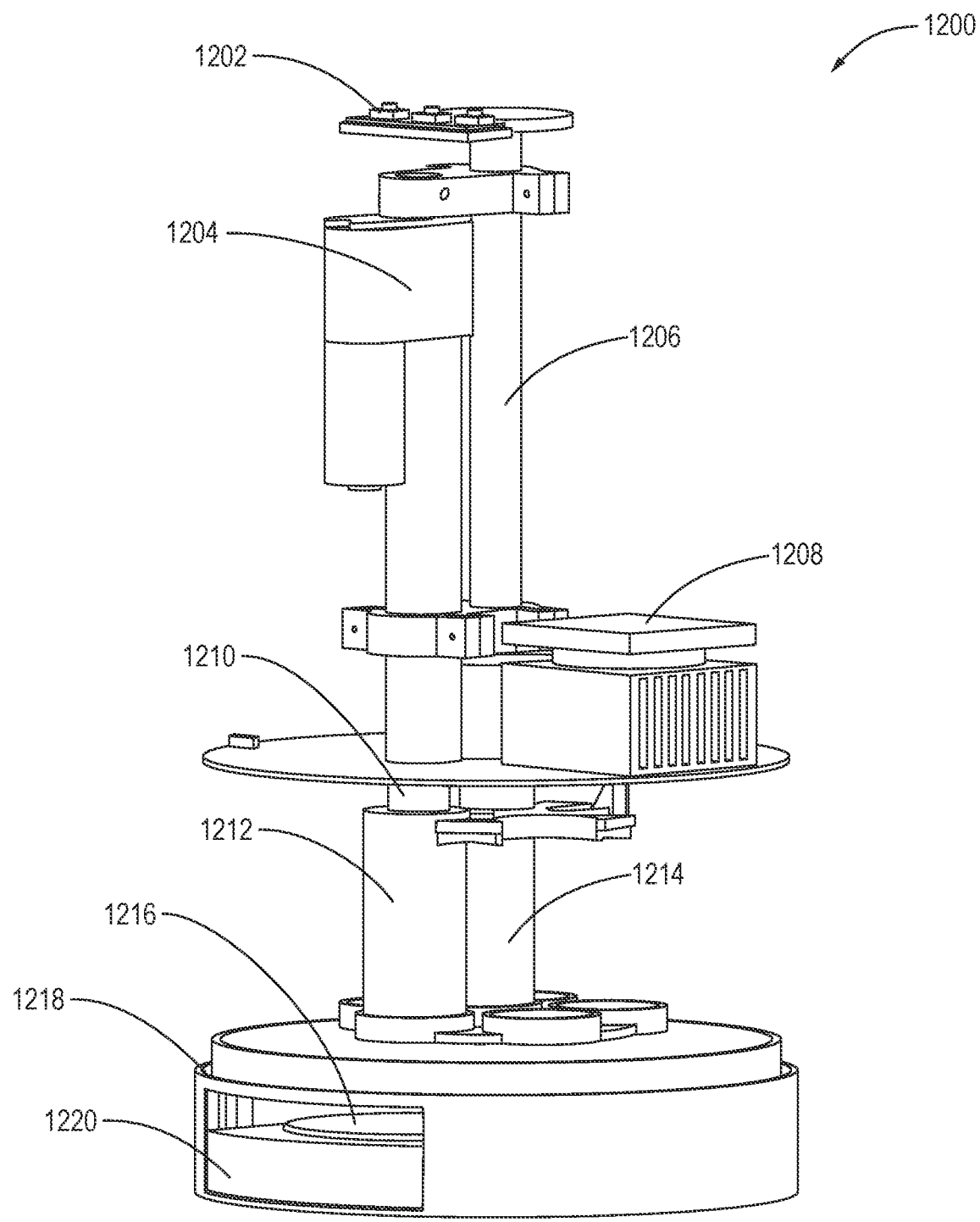

FIGS. 12A and 12B are schematic diagrams depicting an internal structure 1200 of an embodiment of an automated pet food dispenser. FIG. 12A depicts an isometric view of internal structure 1200, while FIG. 12B depicts a side view of internal structure 1200. Internal structure 1200 may be associated with an internal structure of automated pet food dispenser 1100 that may be revealed if outer housing 1104 is removed from automated pet food dispenser 1100. As depicted, internal structure 1200 includes user interface 1202, linear actuator 1204, support structure 1206, cooling unit 1208, plunger 1210, receptacle 1212, carousel 1214, food bowl 1216, base 1218, and drawer 1220. Internal structure 1200 may also include a processing system such as processing system 102 (not depicted in FIGS. 12A and 12B).

In one aspect, user interface 1202 is similar to user interface 202. User interface 1202 may be configured to allow a user (e.g., a pet owner) to interact with automated food dispenser 1100. User interface 1202 may include any combination of input/output devices such as push buttons, video display screens, LCD screens, touch screens, switches, incandescent bulbs, LED bulbs, haptic feedback devices, and so on. In one aspect, a user programs data such as a feeding schedule (e.g., a feeding time or a feeding time interval), and a quantity of wet pet food to be dispensed, via user interface 1202. In one aspect, user input/output components associated with user interface 1202 may be integrated onto a printed circuit board (PCB). User interface 1202 may be configured to drive the one or more LEDs associated with upper structure 1102.

Linear actuator 1204 may be similar to actuator 104 or linear actuator 206. Linear actuator 1204 may receive one or more instructions or commands from a processing system such as processing system 102 to extend or retract plunger 1210. Linear actuator 1204 may be any of a lead screw linear actuator, a pneumatic actuator, a hydraulic actuator, or a rigid chain-based actuator.

Support structure 1206 may be similar to support 108. Support structure may provide a substantially rigid support to one or more internal components of automated pet food dispenser such user interface 1202, linear actuator 1204, cooling unit 1208, plunger 1210, receptacle 1212, and carousel 1214.

In one aspect, cooling unit 1208 may function in a similar manner as cooling unit 608. In one aspect, cooling unit 1208 provides cooling or refrigeration functions to keep wet pet food in a pet food container (e.g., pet food container 112) within a receptacle (e.g., receptacle 1212) at a lower temperature than an ambient temperature. Cooling unit 1208 may also be referred to as a "refrigeration unit." Maintaining the wet pet food at a lower temperature than the ambient temperature helps increase food shelf life, reduce bacterial growth rates, and keep the wet pet food fresh for a longer period of time.

In one aspect, cooling unit 1208 may be any combination of a thermoelectric cooler, a heatsink, and a fan. The thermoelectric cooler may help reduce a temperature of the wet pet food to a temperature below the ambient temperature. The heatsink may be used to dissipate any heat generated by components such as cooling unit 1208, linear actuator 1204, or processing system 102. The fan may be used to circulate air within automated pet food dispenser 1100 to maintain a substantially constant temperature within automated pet food dispenser 1100 or within a portion of automated pet food dispenser 1100.

In one aspect, processing system 102 monitors a temperature of the wet pet food in a pet food container such as pet food container 112, and controls cooling unit 1208 via a feedback control loop to maintain the wet pet food at a substantially constant temperature. Such a feedback control loop may be configured such that cooling unit 1208 is switched on or off based on commands from processing system 102. This, in turn, can allow automated pet food dispenser 1100 to account for daily and seasonal temperature fluctuations in the ambient temperature while maintaining the temperature of the wet pet food in pet food container 112 at a substantially constant value.

In one aspect, a pet food container similar to pet food container 112 may be inserted or placed into receptacle 1212. In one aspect, receptacle 1212 may be referred to as a food container. At a designated pet feeding time, processing system 102 may command linear actuator 1204 to extend plunger 1210 into receptacle 1212. Plunger 1210 may exert a force on the pet food container within receptacle 1212. In one aspect, motion of the pet food container within receptacle 1212 is constrained by an insert. The insert may prevent motion of the pet food container while linear actuator 1204 applies a force to the pet food container via plunger 1210. In another aspect, receptacle 1212 is constructed to have a built-in physical restraint that prevents motion of the pet food container while linear actuator 1204 applies a force to the pet food container via plunger 1210. The force exerted by plunger 1210 may cause the pet food container to rupture, and the contents of the pet food container may be dispensed into food bowl 1216 through an opening at the bottom of receptacle 1212.

In one aspect, piston 1210 is similar to piston 106. Piston 1210 may be configured to be substantially coaxial with receptacle 1212, so that piston 1210 is contained within receptacle 1212 when piston 1210 is extended by linear actuator 1204.

In one aspect, piston 1210 is similar to plunger 106. Piston 1210 may be configured to be substantially coaxial with receptacle 1212, so that piston 1210 is contained within receptacle 1212 when piston 1210 is extended by linear actuator 1204.

In one aspect, a quantity of pet food dispensed may be measured by a load cell (not depicted in internal structure 1200). Measurements from the load cell may be received by processing system 102. Processing system 102 may command linear actuator 1204 to stop extending plunger 1210 when a quantity of food in food bowl 1216 as measured by the load cell is greater than or equal to a predetermined amount. Processing system 102 may also retract plunger 1210.

Once a requisite quantity of pet food is dispensed into food bowl 1216, processing system may command an electrical motor to extend drawer 1220 and reveal food bowl 1216 to a pet. This initiates a feeding routine. Drawer 1220 may be similar to drawer 1106. Drawer 1120 may be alternatively referred to as a "tray." In one aspect, the electrical motor actuates the extension of drawer 1220 along a linear path, using a rack-and-pinion mechanism.

Processing system 102 may be configured to keep a track of time elapsed since drawer 1220 is extended. Processing system 102 may also be configured to keep a track of a weight of wet pet food remaining in food bowl 1216 based on one or more weight measurements from the load cell. If the time elapsed is greater than or equal to a predetermined time limit or the weight of wet pet food remaining in food bowl 1216 is significantly less than the dispensed quantity (suggesting that all or most of the wet pet food has been consumed), then processing system 102 may retract drawer 1220 back into base 1218. Base 1218 may provide a concealing enclosure for food bowl 1216, as well as a bottom support for internal elements of automated pet food dispenser 1100.

In one aspect, drawer 1220 may include one or more accelerometers and/or gyroscopes to measure vibration motion of drawer 1220 and food bowl 1216. These vibration measurements may be transmitted to processing system 102. Excessive vibrations may suggest that a pet is currently in a vicinity of automated pet food dispenser 1100, and might be currently feeding. Processing system 102 may make a decision to keep drawer 1220 extended while vibration measurements are at relatively higher levels. A substantial reduction in vibration levels may suggest that the pet has finished feeding and has left a vicinity of automated pet food dispenser 1100. Processing system 102 may command drawer 1220 to retract responsive to this reduction.

In one aspect, processing system 102 is configured to determine how rapidly food is being consumed from food bowl 1216. This functionality may be accomplished by computing a rate of food consumption as a function of time, where load cell readings associated with the weight of the wet pet food in food bowl 1216 are sampled at discrete time intervals.

In one aspect, carousel 1214 is configured to hold multiple receptacles such as receptacle 1212. For example, carousel 1214 may hold six receptacles. Carousel 1214 may also be configured to rotate about an axis of rotation that may be substantially parallel to an axis associated with linear actuator 1214 and plunger 1210. A user may fill each of the multiple receptacles held by carousel 1214 with an individual pet food container that may be similar to pet food container 112.

In one aspect, carousel 1214 is initially positioned such that a first receptacle is substantially coaxial with plunger 1210. Processing system 102 may initiate a pet feeding routine from a pet food container contained in this first receptacle. Processing system 102 may be configured to determine how much food remains in the pet food container based on how much plunger 1210 is extended. When plunger 1210 is extended to a certain length (e.g., 6 inches), processing system 102 may determine that a bottom of plunger 1210 may be close to a bottom end of the first receptacle. This, in turn, indicates that the pet food container contained within the first receptacle is substantially empty. Responsive to this determination, processing system 102 may retract plunger 1210 so that plunger 1210 is completely outside of the first receptacle. Processing system 102 may then command an electrical motor connected to carousel 1214 to rotate carousel 1214 about the axis of rotation so that a second receptacle filled with a pet food container is substantially coaxial with plunger 1210. A subsequent feeding routine is then initiated from the second receptacle, till the pet food container contained in the second pet food receptacle is substantially empty. The second receptacle is then replaced by a third receptacle by rotating carousel 1214, and so on, till the pet food containers in all receptacles have been used up. Processing system 102 may then issue one or more alerts to a user via user interface 1202, or to computing system 116 via wireless communication link 120.

Carousel 1214 allows extended periods of multiple unattended pet feeding sessions via the multiple receptacles. Carousel 1214 may be especially beneficial if a pet owner has to be out of the home for extended periods of time (e.g., a vacation).

Figure 13:
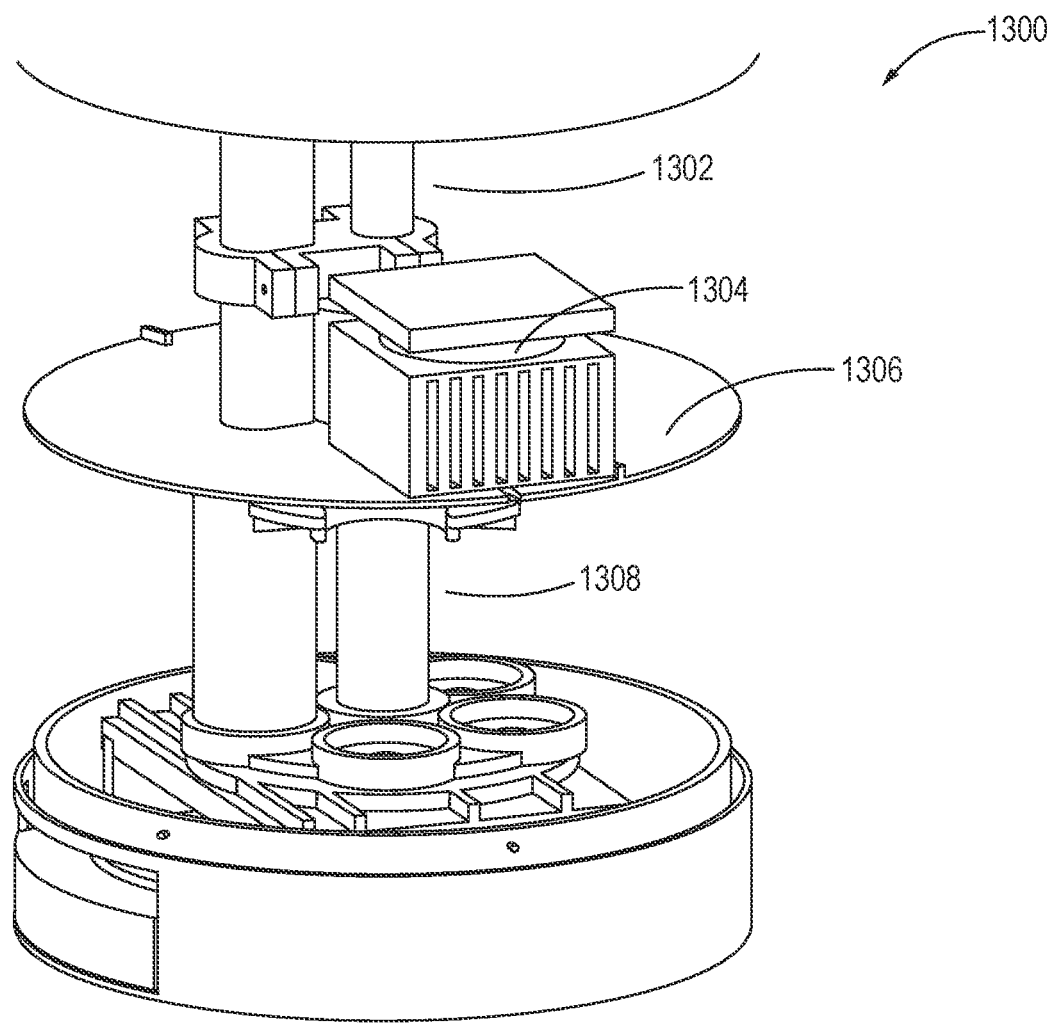
FIG. 13 is a schematic diagram depicting an internal structure of an embodiment of an automated pet food dispenser.

FIG. 13 is a schematic diagram depicting an internal structure 1300 of an embodiment of automated pet food dispenser 1100. As depicted, internal structure 1300 includes hot side plenum 1302, cooling unit 1304, thermal bulkhead 1306, and cold side plenum 1308.

In one aspect, cooling unit 1304 is similar to cooling unit 1208. Thermal bulkhead 1306 may be configured to thermally isolate hot side plenum 1302 from cold side plenum 1308. Hot side plenum 1302 may be a portion of an internal structure of automated pet food dispenser 1100 that is at a higher temperature relative to cold side plenum 1308. Hot side plenum may include linear actuator 1204, processing system 102, user interface 1202, cooling unit 1208, and other components that may generate heat during operation.

Thermal bulkhead 1306 may function to thermally isolate cold side plenum 1308 from the heat generated by these heat-generating components.

In one aspect, cold-side plenum 1308 is cooled by cooling unit 1304 to be at a temperature that is lower than an ambient temperature. Cold-side plenum 1308 may include components such as carousel 1214, and receptacle 1212 that may further include a pet food container. Cold-side plenum 1308 may include a space around the multiple receptacles associated with carousel 1214, whose temperatures are being controlled. Some aspects include one or more insulating features (e.g., insulation 606) in outer housing 1104 or base 1218 to help regulate heat flow. Thermal bulkhead 1306 reduces an amount of heat transferred from hot side plenum 1302 to cold side plenum 1308. This further helps maintain a temperature of one or more pet food containers stored in cold side plenum 1308 at a temperature below an ambient temperature. This further helps in maintaining pet food freshness, while reducing bacterial growth rates.

Figure 14:
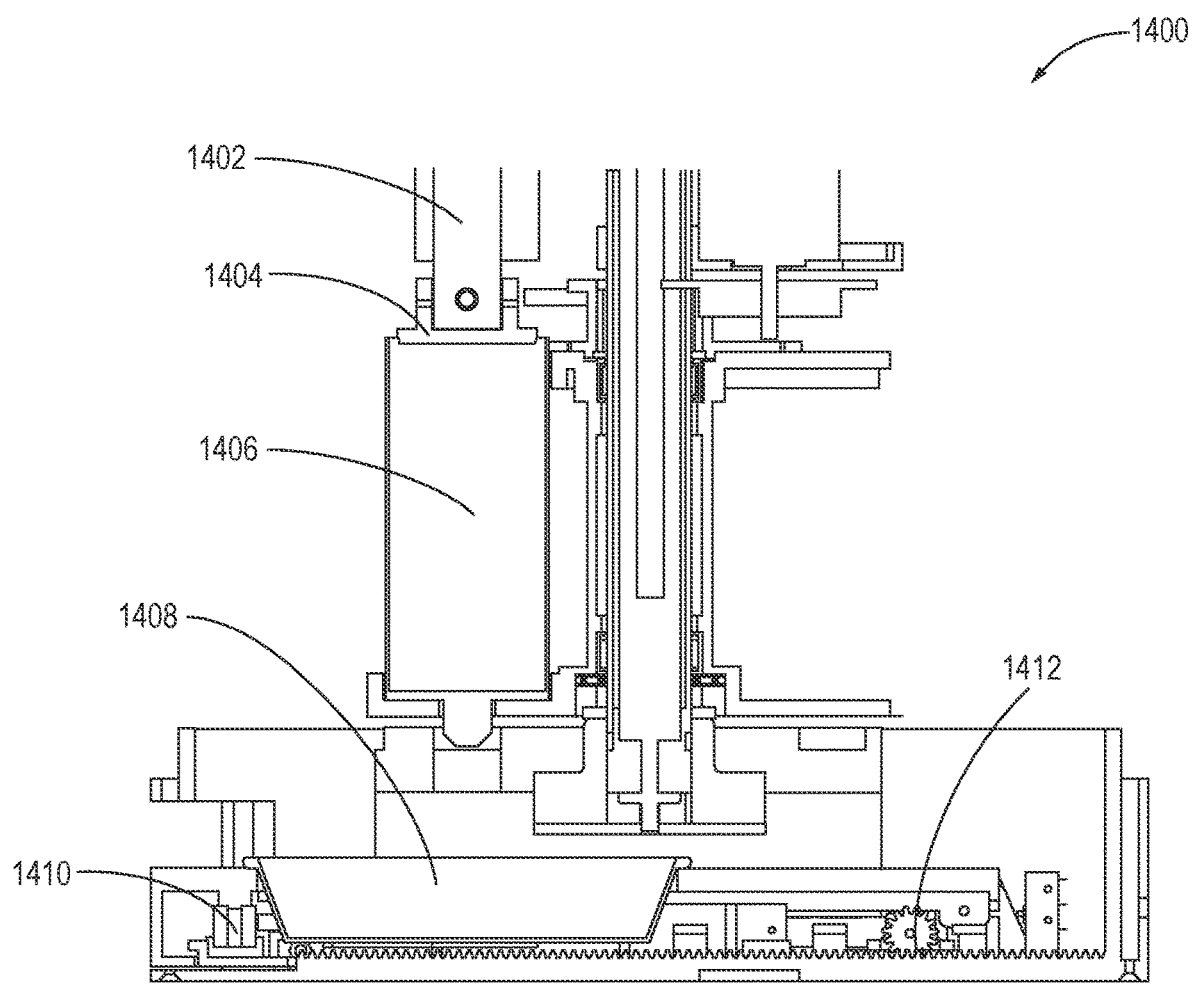
FIG. 14 is a schematic diagram depicting a cross-sectional view of a portion of an automated pet food dispenser.

FIG. 14 is a schematic diagram depicting a cross-sectional view 1400 of a portion of automated pet food dispenser 1100. As depicted, cross-sectional view includes linear actuator 1402, plunger 1404, receptacle 1406, food bowl 1408, load cell 1410, and rack-and-pinion mechanism 1412.

Linear actuator may be similar to linear actuator 1204, plunger 1404 may be similar to plunger 1210, receptacle 1406 may be similar to receptacle 1212, food bowl 1408 may be similar to food bowl 1216, and load cell 1410 may be similar to load cell 118.

Cross-sectional view 1406 depicts how linear actuator 1402, plunger 1404, and receptacle 1406 are substantially coaxial. Cross-sectional view 1406 also depicts how plunger 1404 is designed to be contained within receptacle 1406.

In one aspect, processing system 102 is configured to extend or retract drawer 1220 via an electrical motor that actuates rack-and-pinion mechanism 1412. This extension or retraction may be associated with one or more pet feeding events. Load cell 1410 may be configured to measure a weight of dispensed wet pet food in food bowl 1408.

Figure 15:
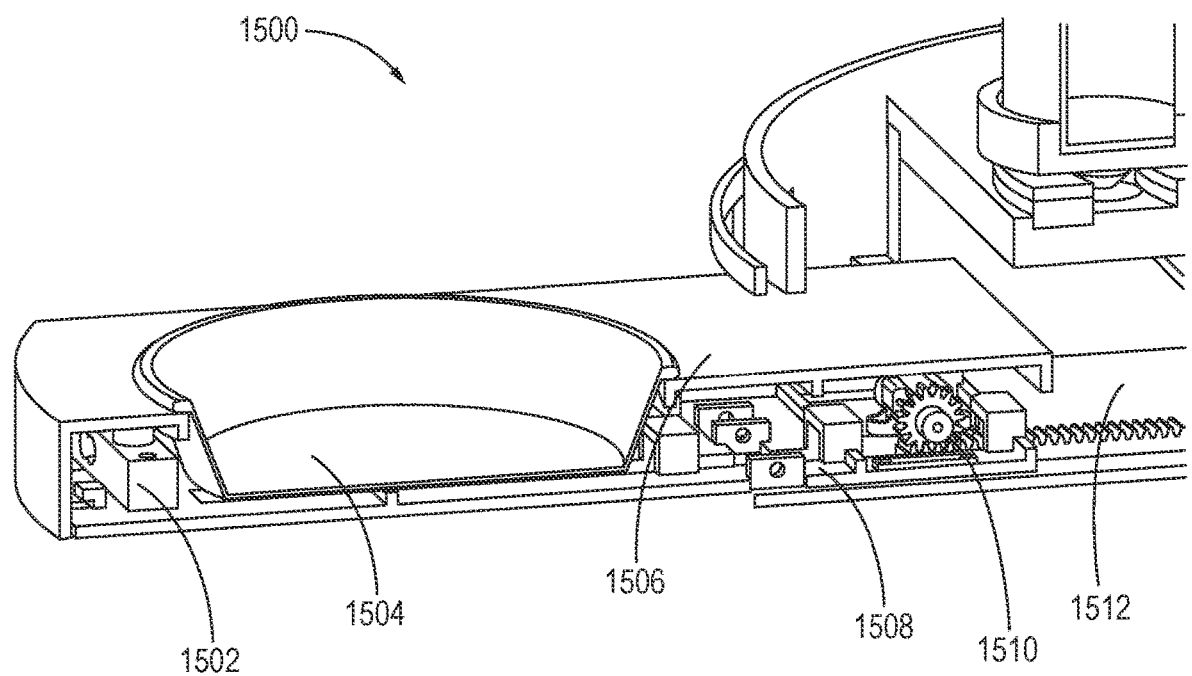
FIG. 15 is a schematic diagram depicting a cross-sectional view of a bowl tray assembly.

FIG. 15 is a schematic diagram depicting a cross-sectional view of a bowl tray assembly 1500. As depicted, bowl tray assembly 1500 includes load cell 1502, food bowl 1504, upper section 1506, lower section 1508, electrical motor 1510, and base 1512.

Load cell 1502 may be similar to load cell 1410, and food bowl 1504 may be similar to food bowl 1408. Upper section 1506 and lower section 1508 may be configured to collectively enclose internal components such as load cell 1502 and electrical motor 1510 while forming an external structure for drawer 1220. Electrical motor 1510 may be configured to drive rack-and-pinion mechanism 1412 under command of processing system 102. Base 1512 may be similar to base 1218.

Figure 16:
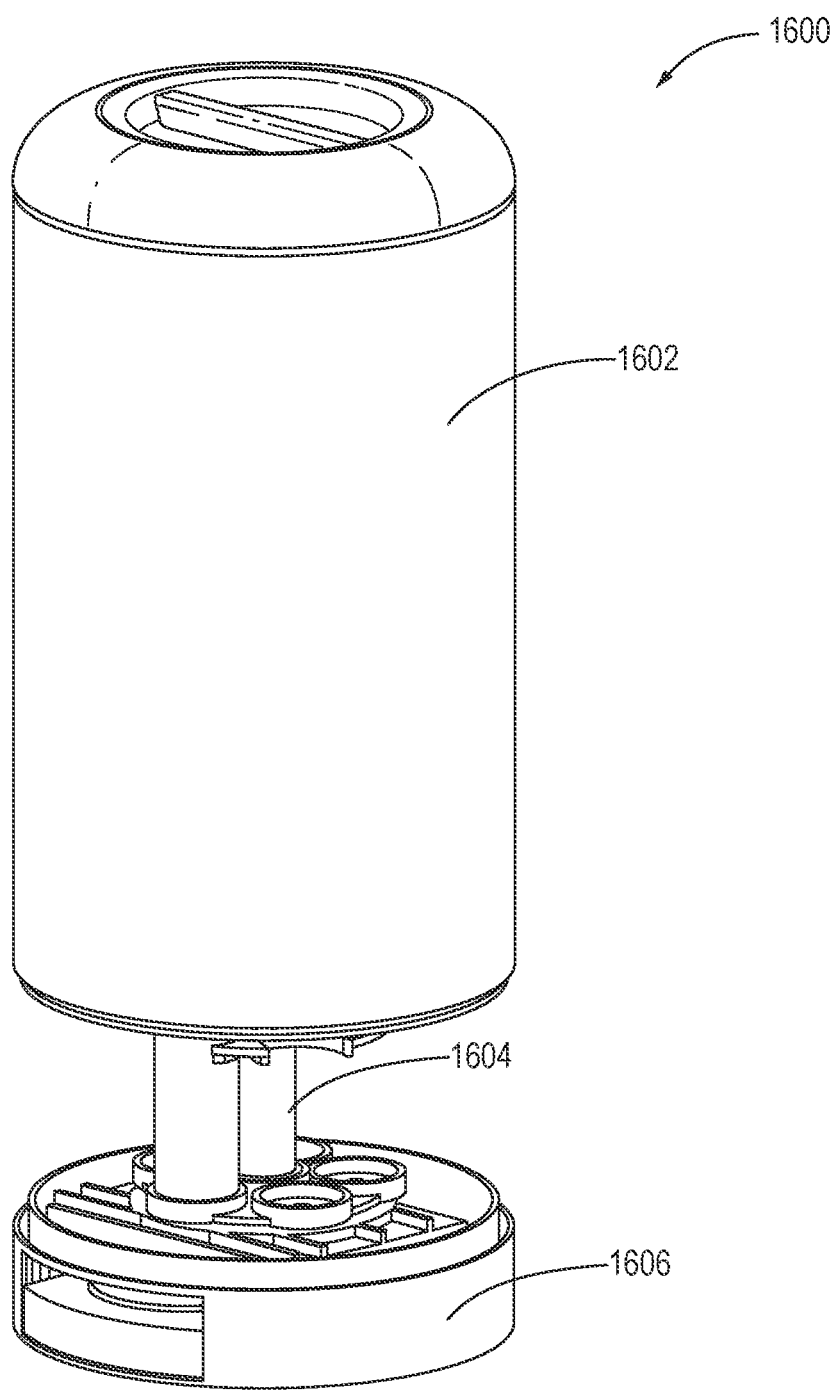
FIG. 16 is a schematic diagram depicting a view of an embodiment of an automated pet food dispenser.

FIG. 16 is a schematic diagram depicting a view 1600 of automated pet food dispenser 1100. As depicted, view 1600 shows automated pet food dispenser 1100 in a partially disassembled state. As depicted view 1600 includes outer housing 1602, support structure 1604, and base 1606. Outer housing may be similar to outer housing 1104, support structure 1604 may be similar to support structure 1206, and base 1606 may be similar to base 1218. In one aspect, outer housing 1602 may be removed from automated pet food dispenser 1100 along a vertical direction. Such a removal allows a user access to internal components of automated pet food dispenser 1100. For example, a user may remove outer cover 1100 to remove empty pet food containers and/or refill one or more receptacles with new pet food containers. A service technician may remove outer cover 1100 to service or repair one or more components of automated pet food dispenser 1100. For example, the service technician may plug in a diagnostic tool into processing system 102 to run fault detection and other diagnostic procedures.

Figure 17:
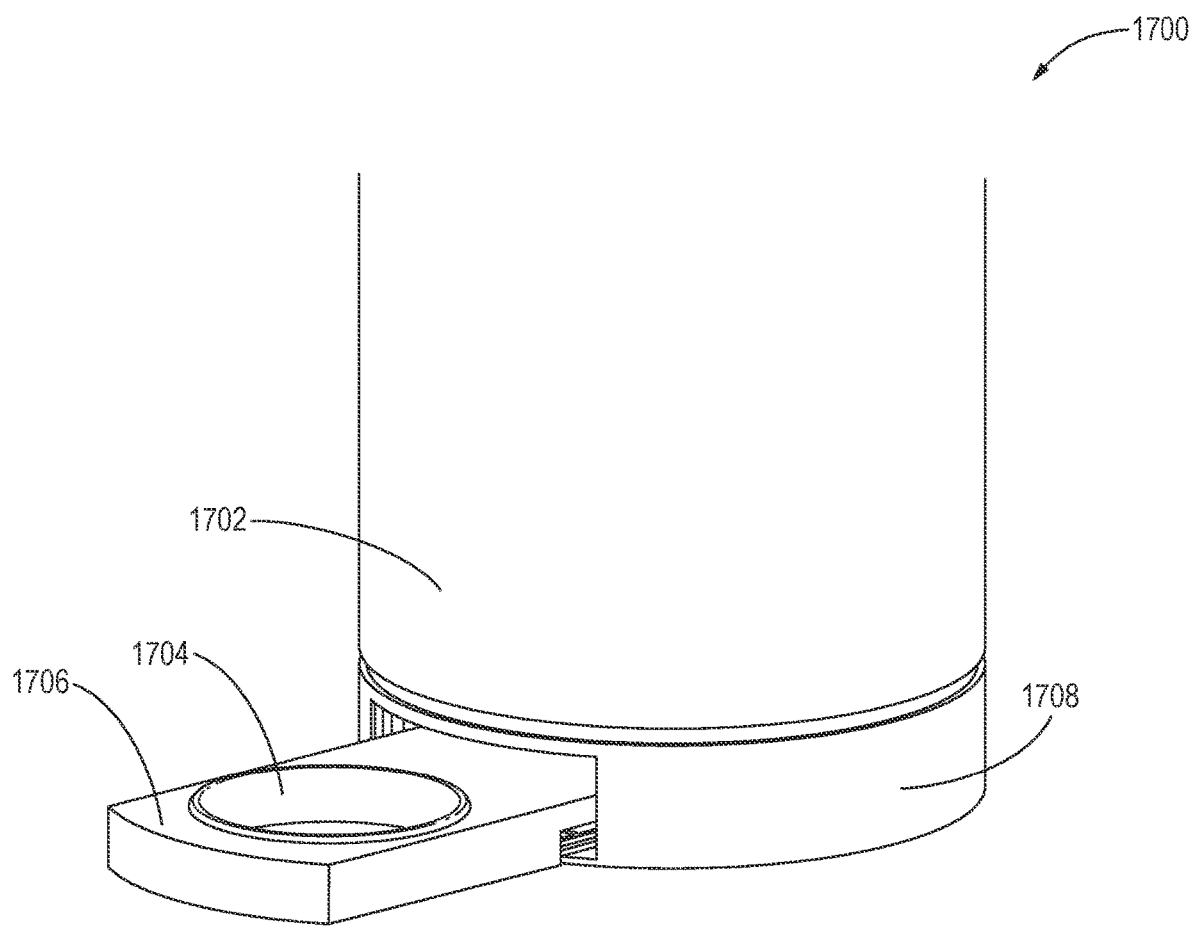
FIG. 17 is a schematic diagram depicting a portion of an embodiment of an automated pet food dispenser.

FIG. 17 is a schematic diagram depicting a portion 1700 of automated pet food dispenser 1100. As depicted, portion 1700 includes outer cover 1702, food bowl 1704, drawer 1706, and base 1708. Outer cover 1702 may be similar to outer cover 1104, food bowl 1704 may be similar to food bowl 1216, drawer 1706 may be similar to drawer 1220, and base 1708 may be similar to base 1218.

Drawer 1706 is depicted to be in an extended state. This extension may be initiated by processing system 102 during a feeding event. Processing system 102 may also extend drawer 1706 based on a user command. For example, a user may instruct processing system to extend drawer 1706 so that the user may remove food bowl 1704 for cleaning. This extension may be accomplished via rack-and-pinion mechanism 1412 and electrical motor 1510 via command from processing system 102.

Figure 18:
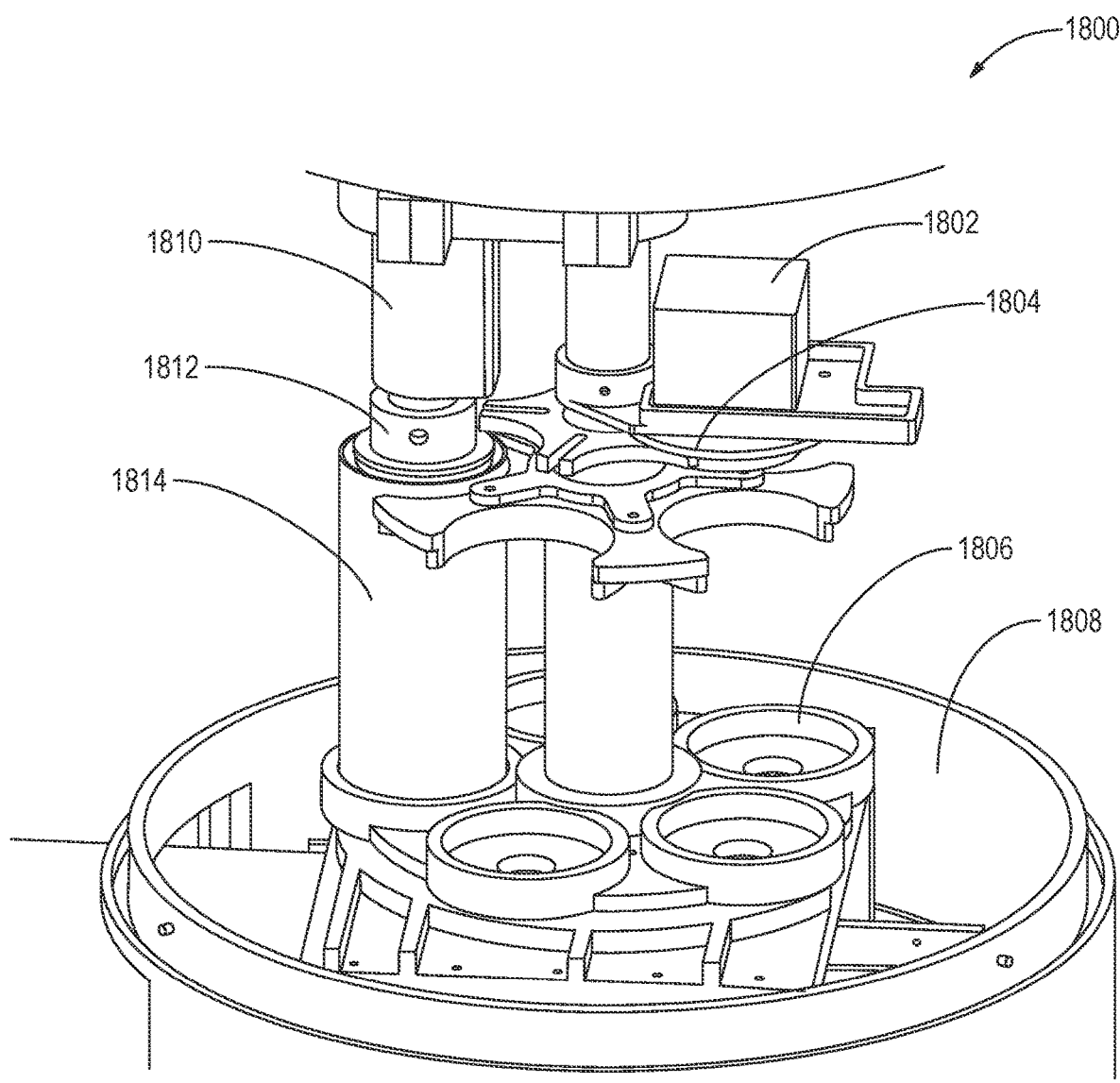
FIG. 18 is a schematic diagram depicting an internal structure of an embodiment of an automated pet food dispenser.

FIG. 18 is a schematic diagram depicting an internal structure 1800 of automated pet food dispenser 1100. As depicted, internal structure 1800 includes electrical motor 1802, rotating element 1804, carousel 1806, base 1808, linear actuator 1810, plunger 1812, and receptacle 1814.

In one aspect, carousel 1806 is similar to carousel 1214, base 1808 is similar to base 1218, linear actuator 1810 is similar to linear actuator 1204, plunger 1812 is similar to plunger 1210, and receptacle 1814 is similar to receptacle 1212.

In one aspect, electrical motor 1802 is commanded by processing system 102 to rotate carousel 1806. Such a rotation command may be initiated by processing system 102 to switch between a receptacle containing a substantially empty pet food container to a receptacle containing a new pet food container. In one aspect, electrical motor 1802 may rotate carousel 1806 using rotating element 1804. In one aspect, rotating element 1804 is a Geneva wheel or a Geneva drive. Receptacle 1814 and other receptacles associated with carousel 1806 may be removable by a user for cleaning or replacement.

Embodiments of automated pet food dispenser such as automated pet food dispenser 100, automated pet food dispenser 200, and automated pet food dispenser 1100 may include any combination of the following features:

- The communication link between processing system 102 computing system 116 may also include a wired communication link such as USB, Ethernet, UART, or some other wired communication interface.
- Embodiments of automated pet food dispensers described herein may be powered by any combination of electrical power sourced from an electrical outlet or electrical power sourced from one or more batteries.
- Embodiments of automated pet food dispensers described herein may include communications security and a programmable ID so that a particular dispenser can be selected using computing system 116 via wireless communication link 120. This is beneficial for scenarios such multi-unit applications like pet hotels, animal hospitals, common carriers transporting multiple pets at a time, and so on.
- In one aspect, a user can fill pet food containers containing different kinds of wet pet food in different receptacles when initializing carousel 1214. The user can then program processing system 102 (for example, via computing system 116 or via user interface 202) to dispense a specific kind of food at a specific feeding time in the feeding schedule.

Some aspects may include a user logging in to an application software running on computing system 116. This application software may allow the user keep track of when a pet food container has been put in, its expiration date, and other parameters. The application software may warn the user when an expiration date associated with a pet food container is getting near.

Parameters associated with scheduling feeding times and feeding amounts may include any combination of ambient temperature, previous patterns of consumption, detecting a pet's presence, an abundance or a scarcity of remaining food in the carousel, and so on.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method of feeding a pet, the method comprising:
removing an outer housing from a base to access a carousel comprising a plurality of receptacles;
positioning a plurality of sealed containers of a wet pet food in the plurality receptacles on the carousel;
placing the outer housing onto over the plurality of sealed containers and the carousel and onto the base;
maintaining a temperature of the plurality of sealed containers lower than an ambient temperature with a thermoelectric cooling unit, the thermoelectric cooling unit located above the carousel and the plurality of sealed containers;
monitoring, with a processing system, a temperature of the plurality of sealed containers with a temperature sensor;
scheduling a plurality of pet feeding events based on user-provided instructions to the processing system, wherein the processing system comprises a digital processing system and the instructions comprise digital instructions;
actuating an electrically-operated plunger in response to a first feeding event;
puncturing a first one of the plurality of sealed containers using the electrically-operated plunger;
dispensing the wet pet food from said first one of the plurality of containers into a food bowl located on a drawer with the drawer retracted;
extending the drawer to feed the pet;
retracting the drawer;
withdrawing the electrically-operated plunger from said first one of the plurality of sealed containers;
rotating the carousel around an axis of rotation to place a second one of the plurality of sealed containers in proximity to the electrically-operated plunger;
puncturing a second one of the plurality of sealed containers with the electrically-operated plunger, in response to a second feeding event, to dispense the wet pet food from the second one of the plurality of containers into the food bowl with the drawer retracted; and
extending the food bowl to feed the pet.

2. The method of claim 1, further comprising:
measuring, using a load cell, a dispensed weight of the wet pet food dispensed into the food bowl, the load cell moving with the drawer when the drawer is extended and retracted;
comparing the dispensed weight to a predetermined threshold weight, wherein the measured dispensed weight and predetermined threshold weight are respectively rendered as digital data; and
deactivating the electrically-operated plunger when the dispensed weight is greater than or equal to the predetermined threshold weight.

3. The method of claim 1, wherein the electrically-operated plunger is actuated by any of a lead screw linear actuator, a pneumatic actuator, a hydraulic actuator, or a rigid chain-based actuator.

4. The method of claim 1, further comprising:
receiving one or more user commands associated with the plurality of pet feeding events and a threshold quantity of the wet pet food to be dispensed;
scheduling the plurality of pet feeding events in accordance with the user commands; and
dispensing a dispensed quantity of wet pet food in accordance with each of the plurality of pet feeding events based on the threshold quantity.

5. The method of claim 1, further comprising initiating the plurality of pet feeding events automatically in accordance with a pre-programmed digital feeding schedule.

6. The method of claim 1, further comprising initiating a pet feeding event upon receiving a user command.

7. The method of claim 6, wherein the user command is received via a user interface.

8. The method of claim 7, wherein the user interface comprises a touchscreen.

9. The method of claim 1, further comprising:
providing a hot side plenum configured to house the processing system;
providing a cold side plenum below the hot side plenum to maintain the temperature of the plurality of sealed containers lower than the ambient temperature; and
thermally isolating, using a thermal bulkhead, the hot side plenum from the cold side plenum.

* * * * *